(12) United States Patent
Shibata

(10) Patent No.: US 9,921,705 B2
(45) Date of Patent: Mar. 20, 2018

(54) RESISTIVE FILM TYPE TOUCH PANEL HAVING ELECTRODE GROUPING AND ROUTING WIRES ARRANGED TO MINIATURIZE THE TOUCH PANEL, AND A METHOD OF DETECTING A PRESSING POSITION ON THE TOUCH PANEL

(71) Applicant: NISSHA PRINTING CO., LTD., Kyoto-shi, Kyoto (JP)

(72) Inventor: Junichi Shibata, Kyoto (JP)

(73) Assignee: Nissha Co., Ltd., Kyoto (JP)

( * ) Notice: Subject to any disclaimer, the term of this patent is extended or adjusted under 35 U.S.C. 154(b) by 0 days.

(21) Appl. No.: 15/121,568

(22) PCT Filed: Feb. 23, 2015

(86) PCT No.: PCT/JP2015/054996
§ 371 (c)(1),
(2) Date: Aug. 25, 2016

(87) PCT Pub. No.: WO2015/129614
PCT Pub. Date: Sep. 3, 2015

(65) Prior Publication Data
US 2016/0364050 A1    Dec. 15, 2016

(30) Foreign Application Priority Data

Feb. 26, 2014  (JP) ................................. 2014-034817
Apr. 22, 2014  (JP) ................................. 2014-087932

(51) Int. Cl.
G06F 3/041    (2006.01)
G06F 3/045    (2006.01)

(52) U.S. Cl.
CPC ............ *G06F 3/045* (2013.01); *G06F 3/0416* (2013.01); *G06F 2203/04104* (2013.01)

(58) Field of Classification Search
CPC ......... G06F 3/044; G06F 3/045; G06F 3/0416
(Continued)

(56) References Cited

U.S. PATENT DOCUMENTS 5,367,130 A *  11/1994  Isono ..................... G06F 3/045
                                                      178/18.02
2003/0103043 A1   6/2003  Mulligan et al.
(Continued)

FOREIGN PATENT DOCUMENTS

JP    H04-17456 B2    3/1992
JP    2000-172424 A    6/2000
(Continued)

OTHER PUBLICATIONS

International Search Report in PCT/JP2015/054996 dated Apr. 21, 2015.

*Primary Examiner* — Adam J Snyder
(74) *Attorney, Agent, or Firm* — Global IP Counselors, LLP

(57) ABSTRACT

A resistive film type touch panel includes a transparent insulating film, a plurality of upper electrodes, and a plurality of routing wires. The plurality of upper electrodes are formed on the lower surface of the transparent insulating film and are arranged in a direction, and includes a group of the electrodes electrically connected with each other. The electrical combinations of the detection electrodes adjacent with each other in the direction of a planned simultaneous detection number are different from one another. The plurality of routing wires extend from the plural upper electrodes, and are formed in a frame area outside of the plurality of upper electrodes on the lower surface. Thus, the number of the electrodes is increased in order to improve the resolution, while also miniaturizing the touch panel.

20 Claims, 14 Drawing Sheets

(58) Field of Classification Search
USPC .................................... 345/173; 178/18.03
See application file for complete search history.

(56) References Cited

U.S. PATENT DOCUMENTS

| | | | |
|---|---|---|---|
| 2007/0074914 A1* | 4/2007 | Geaghan | G06F 3/044 178/18.06 |
| 2010/0171723 A1 | 7/2010 | Kobayashi et al. | |
| 2011/0018557 A1* | 1/2011 | Badaye | G06F 3/044 324/658 |
| 2011/0025638 A1* | 2/2011 | Salaverry | G06F 3/044 345/174 |
| 2011/0050624 A1* | 3/2011 | Lee | G06F 3/045 345/174 |
| 2011/0096015 A1* | 4/2011 | Yilmaz | G06F 3/044 345/174 |
| 2012/0044187 A1* | 2/2012 | Polishchuk | G06F 3/044 345/174 |
| 2012/0062469 A1* | 3/2012 | Guard | G06F 3/044 345/173 |
| 2012/0075201 A1* | 3/2012 | Golovchenko | G06F 3/044 345/173 |
| 2012/0075232 A1* | 3/2012 | Golovchenko | G06F 3/044 345/174 |
| 2012/0154323 A1* | 6/2012 | Nambu | G06F 3/044 345/174 |
| 2013/0080109 A1* | 3/2013 | Peng | G06F 3/044 702/150 |
| 2013/0176276 A1* | 7/2013 | Shepelev | G06F 3/044 345/174 |
| 2014/0035833 A1* | 2/2014 | Gorsica | G06F 3/041 345/173 |
| 2014/0085211 A1* | 3/2014 | Shahparnia | G06F 3/044 345/173 |

FOREIGN PATENT DOCUMENTS

| | | |
|---|---|---|
| JP | 2005-512198 A | 4/2005 |
| JP | 2010-039515 A | 2/2010 |
| JP | 2010-055453 A | 3/2010 |
| JP | 2010-182290 A | 8/2010 |
| JP | 2012-128618 A | 7/2012 |
| JP | 2013-232162 A | 11/2013 |
| WO | 2012173068 A1 | 12/2012 |

* cited by examiner

US 9,921,705 B2

RESISTIVE FILM TYPE TOUCH PANEL HAVING ELECTRODE GROUPING AND ROUTING WIRES ARRANGED TO MINIATURIZE THE TOUCH PANEL, AND A METHOD OF DETECTING A PRESSING POSITION ON THE TOUCH PANEL

CROSS-REFERENCE TO RELATED APPLICATIONS

This U.S. National stage application claims priority under 35 U.S.C. §119(a) to Japanese Patent Application No. 2014-034817, filed in Japan on Feb. 26, 2014, and to Japanese Patent Application No. 2014-087932, filed in Japan on Apr. 22, 2014, the entire contents of Japanese Patent Application Nos. 2014-034817 and 2014-087932 are hereby incorporated herein by reference.

BACKGROUND

Field of the Invention

The present invention is related to a touch panel, and a method of detecting a pressing position of the touch panel.

Background Art

In digital multi-type resistive film touch panel, which is a kind of touch panels, a plurality of line electrodes, which are disposed apart from each other in an up-down direction, are arranged extending in crossing directions of each other. According to this touch panel, when surfaces opposed to each other get into contact with each other due to the pressing, the position is detected as an intersection point of the lines (Refer to Japanese Patent Publication 2010-55453 for example).

According to the above-described touch panel, in order to improve the resolution, it will be necessary to make narrow width of each electrodes so that the number of the electrodes in contact with each other will increase when pressing down. In contrast, if the number of the electrodes increases, the number of routing wires extending from the electrodes increases, as a result, it is likely that width of the frame area (a frame area surrounding the central sensor area) is increased. In other words, if the number of the electrodes increase to improve the resolution, it becomes difficult to miniaturize the touch panel.

It is an object of the present invention to miniaturize the touch panel while increasing the number of the electrodes for improving the resolution.

Below, a plurality of aspect will be explained as means for solving the problem. These aspects can be combined as necessary.

A touch panel according to an aspect of the present invention includes a base member, a plurality of detection electrodes, and a plurality of routing wires.

The detection electrodes are ones formed on a first surface of the base member and are arranged side by side in a first direction. The detection electrodes include a group of the detection electrodes electrically connected with each other. Electrical combinations of the detection electrodes adjacent with each other in the first direction of a planned simultaneous detection number (number of detection electrodes to be used simultaneously for detection) are different from one another.

The plurality of routing wires extend from the plurality of detection electrodes and are formed in an area outside of the plurality of detection electrodes on the first surface of the base member.

In this touch panel, since a group of the detection electrodes electrically connected with each other is included, it is possible to decrease the number of the routing wires, so that the area outside of the plurality of detection electrodes can be reduced, thereby miniaturizing the touch panel.

Furthermore, since the electrical combinations of detection electrodes adjacent with each other in the first direction of a planned simultaneous detection number are different from one another, if the detection electrodes of the planned simultaneous detection number is detected for example, the combination is uniquely determined. It should be noticed that "the electrical combinations of detection electrodes adjacent with each other in the first direction of a planned simultaneous detection number are different from one another" means that if the detection electrodes electrically connected with each other is assumed as one electrode, the combinations of the detection electrodes of the planned simultaneous detection number adjacent with each other in one direction do not include the same one.

Two sets of the above-described structure is prepared and they are disposed in a lamination direction such that the electrode extending directions crosses each other. As a result, it is possible to detect the touch position in the plane.

It should be noticed that the type of the touch panel may be a digital multi-type resistive film type or an electrostatic capacity type.

The number of the detection electrodes electrically connected with each other may be two. The electrical combinations of the two detection electrodes adjacent with each other in the first direction may be different from one another. In this case, the number of routing wires according to the present invention would become close to ½ of those required conventionally, for example.

Furthermore, since the electrical combinations of the two detection electrodes adjacent with each other in the first direction are different from one another, if the two electrodes are detected for example, the combination is uniquely determined. It should be noticed that "the electrical combination of the two detection electrodes adjacent with each other in the first direction are different from one another" means that if a pair of the detection electrodes electrically connected with each other is assumed as one electrode, the combinations of the two detection electrodes adjacent with each other in the first direction do not include the same one.

The plurality of the detection electrode may include a first pair of electrodes consisting of a first electrode and a second electrode connected with each other, and a second pair of electrodes consisting of a third electrode and a fourth electrode connected with each other.

The third electrode may be arranged between the first electrode and the second electrode in the first direction closer to the second electrode, and a gap is defined between the first electrode and the third electrode in the first direction for arranging a fourth electrode of another second pair.

The second electrode may be arranged between the third electrode and the fourth electrode in the first direction closer to the third electrode, and a gap is defined between the second electrode and the fourth electrode in the first direction for arranging a first electrode of another first pair.

In this touch panel, the first electrode of the first pair, the fourth electrode of another second pair, the third electrode of the second pair, the second electrode of the first pair, the first electrode of another first pair, and the fourth electrode of the second pair are arranged in this order in the first direction, for example. Since the electrical combinations of the detection electrodes adjacent with each other in the first direction are different from one another as described above, the combination is uniquely determined if two detection electrodes are detected for example.

The number of the detection electrodes electrically connected with one another may be three, and the electrical combinations of the three detection electrodes adjacent with one another in the first direction may be different from one another. In this case, the number of the wires according to the present invention would become close to ⅓ of those required conventionally. It should be noticed that "electrical combinations of the three detection electrodes adjacent with one another in the first direction are different from one another" means that if the detection electrodes connected with each other in one group are assumed as one electrode, the combinations of the three detection electrodes adjacent with each other in one direction do not include the same one.

The plurality of detection electrodes may include a first group of electrodes consisting of a first detection electrode, a second detection electrode, and a third detection electrode connected with one another and arranged in this order in the first direction, and a second group of electrodes consisting of a fourth detection electrode, a fifth detection electrode, and a sixth detection electrode connected to one another and arranged in this order in the first direction.

The fourth detection electrode may be arranged between the second detection electrode and the third detection electrode in the first direction. The third detection electrode may be arranged between the fourth detection electrode and the fifth detection electrode in the first direction. A gap may be defined between the first detection electrode and the second detection electrode in the first direction for arranging a sixth detection electrode of another second group. A gap may be defined between the fifth detection electrode and the sixth detection electrode in the first direction for arranging a first detection electrode of another first group.

In this touch panel, for example, the first detection electrode of the first group, the sixth detection electrode of another second group, the second detection electrode of the first group, the fourth detection electrode of the second group, the third detection electrode of the first group, the fifth detection electrode of the second group, the first detection electrode of another first group, the sixth detection electrode of the second group are arranged in this order in the first direction. Since the electrical combinations of the three detection electrodes adjacent with one another in the first direction are different from one another, the combination is uniquely determined if three detection electrodes are detected for example.

The plurality of detection electrodes may include plural groups each consisting of a first-side electrode, an intermediate electrode, and a second-side electrode connected to one another and arranged in this order in the first direction.

The first-side electrode and the intermediate electrode may include first ends in a second direction crossing the first direction, and the first ends are connected with each other. The intermediate electrode and the second-side electrode may include second ends opposite to the first ends in the second direction, and the second ends are connected with each other. A gap may be defined between the first-side electrode and the intermediate electrode for arranging a second-side electrode of another group. A gap may be defined between the intermediate electrode and the second-side electrode for arranging a first-side electrode of another group.

In this touch panel, for example, first-side electrode of the first group, the second-side electrode of another group, an intermediate electrode of the first group, a first-side electrode of the second group, the second-side electrode of the first group, the intermediate electrode of the second group, the first-side electrode of another group, the second-side electrode of the second group are arranged in this order in the first direction. Since the electrical combinations of the three detection electrodes adjacent with one another in the first direction are different from one another, the combination is uniquely determined if three detection electrodes are detected for example.

The touch panel may further include a plurality of second detection electrodes and a plurality of the second routing wires. The plurality of the second detection electrodes are arranged side by side in a second direction crossing the first direction and are arranged to overlap the plurality of the detection electrodes. The plurality of the second detection electrodes includes a group of the second detection electrodes electrically connected with each other. Electrical combinations of the second detection electrodes adjacent with one another in the second direction of a planned simultaneous detection number are different from one another. The plurality of the second routing wires extends from the plurality of the second detection electrodes and are formed in an area outside of the second detection electrodes.

The touch panel may further includes a first resistance provided between the detection electrodes electrically connected with each other, a reference resistance connected to the first resistance in series, a plurality of second detection electrodes, which are opposed to the plurality of detection electrodes with a gap therebetween, and can make contact with the plurality of detection electrodes, a power source configured to apply voltage to at least one of the second detection electrodes, and a voltage detector configured to measure voltage drop at the reference resistance.

In this touch panel, while the power source is applying the voltage to at least one of the second detection electrodes, if the voltage detector measures the voltage drop of at the reference resistance based on the measured value, it is possible to determine which position of any of the detection electrodes connected with each other is pressed. The reason is that the voltage drop occurs or does not occur at first resistance, and the voltage drop becomes different at any of the second detection electrodes, depending on which position of the both detected detection electrodes is pressed.

It is preferable that the plurality of the second detection electrodes is composed of a material having a high resistance value compared to the plurality of detection electrodes.

A method of detecting a pressing position of the touch panel according to another aspect of the present invention is for detecting a pressing position of the above-described touch panel. The method includes the following steps:

applying voltage to at least one of the second detection electrodes by the power source;

measuring voltage drop at the reference resistance by the voltage detector; and determining, based on the measured value of voltage drop, position of the plurality of the detection electrodes connected with each other that is pressed.

In this touch panel, based on the measured value, it is possible to determine which position of any of the detection electrodes connected with each other is pressed. The reason is that the voltage drop occurs or does not occur at first resistance, and the voltage drop becomes different at any of the second detection electrodes, depending on which position of the both detected detection electrodes is pressed.

In the touch panel according to the present invention, a group of the detection electrodes electrically connected with each other is included, it is possible to decrease the number of routing wires, as a result, an area outside of the plurality of detection electrodes can be reduced, thereby miniaturizing the touch panel.

DESCRIPTION OF EMBODIMENTS

1. First Embodiment (1) Touch Panel Device

Figure 1:
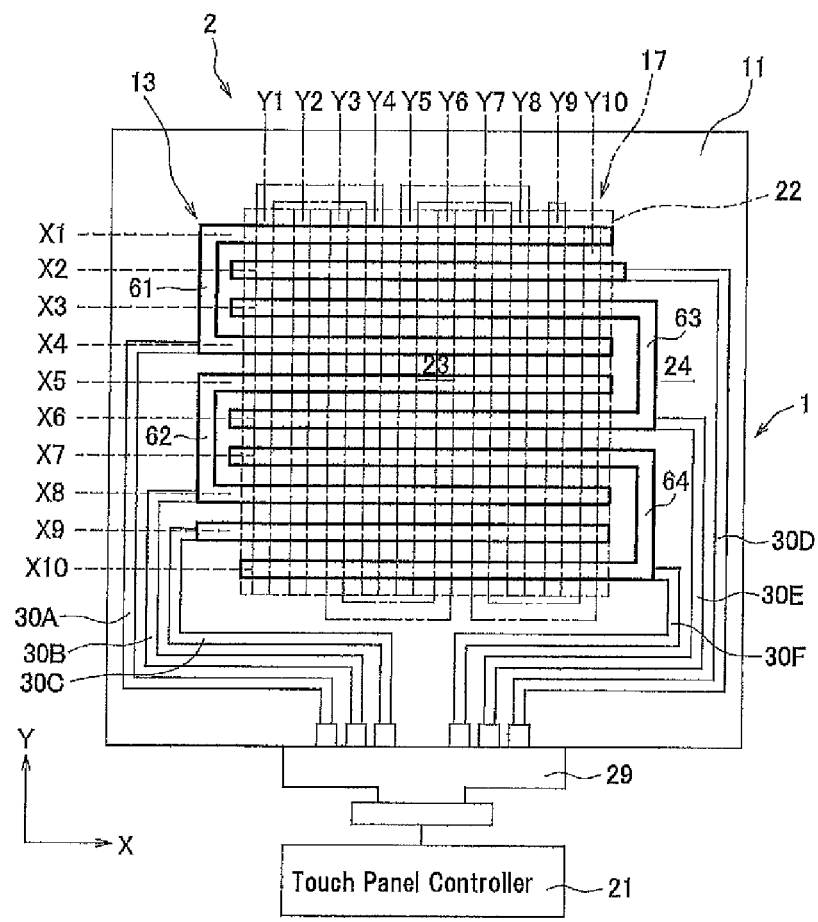
FIG. 1 is a schematic plane view of the touch panel device according to a first embodiment, showing the upper electrode group and the routing wires connected to the upper electrode group.
Figure 2:
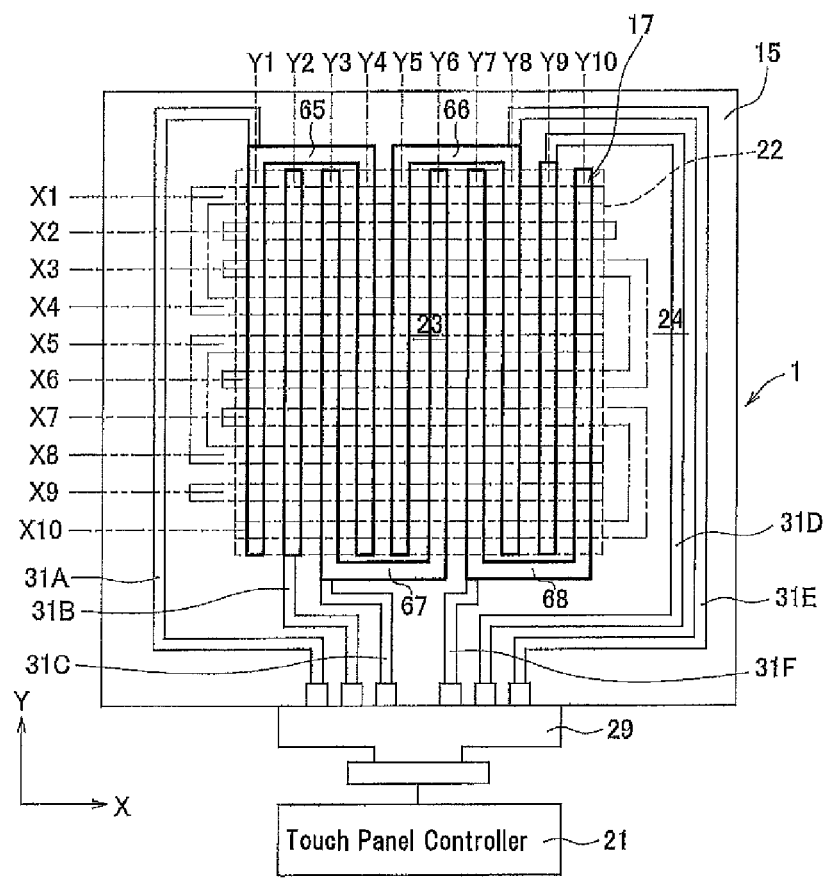
FIG. 2 is a schematic plane view of the touch panel device according to the first embodiment, showing the lower electrode group and routing wires connected to the lower electrode group.
Figure 3:
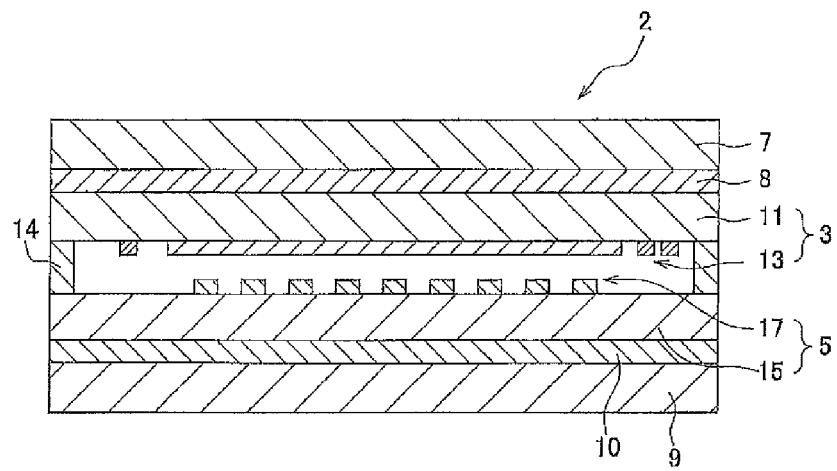
FIG. 3 is a cross section of the touch panel.

Referring to FIG. 1, FIG. 2 and FIG. 3, a touch panel device 1 according to a first embodiment will be described. FIG. 1 and FIG. 2 are schematic plane views of the touch panel device according to the first embodiment. FIG. 1 is a view showing the upper electrode group and the routing wires connected to it, and FIG. 2 is a view showing the lower electrode group and the routing wires connected to it. FIG. 3 is a cross section of the touch panel. The touch panel device 1 can be employed in smart phones, tablet PCs, note PCs and so on, and their accessories, for example.

The touch panel device 1 includes a resistive film type touch panel 2 of matrix type (digital type). The resistive film type touch panel 2 is mainly composed of an upper electrode member 3 and a lower electrode member 5. The upper electrode member 3 includes, as shown in FIG. 3, a transparent insulating film 11 having a shape of rectangle for example, and an upper electrode group 13 formed on a lower surface thereof. The lower electrode member 5 includes a transparent insulating film 15 having a shape of rectangle for example, and a lower electrode group 17 formed on an upper surface thereof, for example. The upper electrode member 3 and the lower electrode member 5 are adhered to each other at peripheral portions thereof via a spacer 14.

The materials of the transparent insulating films 11, 15 may be polycarbonate, polyamide, or polyether ketone engineering plastic, or acryl, polyethylene-telephthalate or polybutylene terephthalate resin film.

The upper electrode group 13 and the lower electrode group 17 may be made of a metal oxide film made of tin oxide, indium oxide, antimony oxide, zinc oxide, cadmium oxide, indium tin oxide (ITO), or the like, or, metals such as gold, silver, copper, tin, nickel, aluminum, palladium, or a thin film of the conductive polymer, or the like.

The upper electrode group 13 and the lower electrode group 17 may be made of a conductive paste such as carbon and silver or opaque conductive ink. The conductive ink is an ink having a binder and a conductive material mixed into the binder. As the conductive materials, for example, carbon nanotube, metal grain, metal nanofiber, PEDOT (polyethylenedioxythiophene), which is a conductive resin macromolecule.

The material of the spacer 14 may be a printing layer or paste layer of resin such as acryl resin, epoxy resin, and silicone resin as well as a resin film similar to the transparent insulating base member. In many cases, the spacer 14 generally functions also as a frame-shaped double-sided tape or an adhesive layer made of bond or adhesive for fixing the upper electrode member 3 and the lower electrode member 5.

Duet to the spacer 14, the upper electrode group 13 and the lower electrode group 17 are arranged overlapping each other in a plane view, and are opposed to each other in an up-down direction with a gap therebetween. Accordingly, if an area of the upper electrode group 13 is pressed down toward the lower electrode group 17, the upper electrode and the lower electrode positioned in the pressing-down area are electrically connected with each other. The pressing down can be performed with a finger, a stylus pen, a rod, and so on.

On the transparent insulating film 11, a decorating film 7 is adhered via PSA 8. The decorating film 7 is a film with hardcoat, for example. The PSA 8 is a double-sided tape, for example. On a lower surface of the transparent insulating film 15, a substrate 9 is adhered via PSA 10. The substrate 9 may be made of PC polycarbonate, glass, and so on.

It should be noticed that the concrete "number, kind and lamination order of the layers" in the above-described lamination structure is not particularly limited.

The touch panel device 1 further includes a touch panel controller 21. The touch panel controller 21 is realized by programs incorporated in the computer, and CPU, RAM, ROM, IC, and so on. The touch panel controller 21 includes a driving and voltage detecting circuit (not shown). The driving and voltage detecting circuit has a function of applying the voltage to the detection electrode and a function of detecting the change of the voltage to detect the pressing down position.

The upper electrode group 13 and the lower electrode group 17 are a plurality of strip patterns respectively formed on the transparent insulating film 11 and the transparent insulating film 15.

The upper electrode group 13 includes upper electrodes X1-X10, and each of the upper electrodes extends in X direction, which is a right-left direction in FIG. 1. The lower electrode group 17 includes lower electrodes Y1-Y10, and each of the lower electrodes extends in Y direction, which is an up-and-down direction in FIG. 1. It should be noticed that "the number, shape, and position of the upper electrode group and the lower electrode group" are not limited to the ones in the present embodiment.

Accordingly, the resistive film type touch panel 2 is divided into one hundred matrix areas corresponding to intersection points defined between the ten upper electrodes X1-X10 and the ten lower electrodes Y1-Y10. It should be noticed that the upper electrode group and the lower electrode group do not necessarily have to cross each other in perpendicular, and they can cross each other at any angles.

An inside (i.e., the central portion) of a rectangle indicated by dotted lines 22 in FIG. 1 corresponds to a sensor area 23 where the above-described matrix is formed (i.e., a central portion), and an outside (i.e., a peripheral portion surrounding the central portion) of the dotted lines 22 corresponds to the frame area 24.

Referring to FIG. 1, the upper electrodes X1-X10 will be described in detail. The electrode X1 and the electrode X4 are electrically connected with each other, and the electrode X5 and the electrode X8 are electrically connected with each other. The above-described connection points are at first-side ends of the electrodes in X direction (left ends in FIG. 1). As a connection structure, the bus bar electrodes 61, 62 are formed extending in Y direction. In addition, the electrode X3 and the electrode X6 are electrically connected with each other, and the electrode X7 and the electrode X10 are electrically connected with each other. The above-described connection points are at second-side ends of the electrodes in X direction (right ends in FIG. 1). As a connection structure, the bus bar electrodes 63, 64 are formed extending in Y direction.

It should be noticed that although the electrode X2 and the electrode X9 are not connected to other electrodes in this embodiment, they are connected to other electrodes in an embodiment in which the number of electrodes is large.

As described above, in the arrangement in which the adjacent detection electrodes are not electrically connected with each other, a group of the detection electrodes electrically connected with each other is included, specifically, a group of two detection electrodes electrically connected with each other is included.

The above-described structure will be explained using other expressions, below. The plurality of detection electrodes includes a first pair of electrodes consisting of the first electrode (X1) and the second electrode (X4), which are connected with each other, and a second pair of electrodes consisting of the third electrode (X3) and the fourth electrode (X6), which are connected with each other. The third electrode (X3) is arranged between the first electrode (X1) and the second electrode (X4) in Y direction closer to the second electrode (X4). Between the first electrode (X1) and the third electrode (X3) in Y direction, a gap is formed in which the electrode (X2), which corresponds to the fourth electrode of another second pair, is arranged. The second electrode (X4) is arranged between the third electrode (X3) and the fourth electrode (X6) in Y direction closer to the third electrode (X3). Between the second electrode (X4) and the fourth electrode (X6) in Y direction, a gap is formed in which the electrode (X5), which corresponds to the first electrode of another first pair, is arranged.

In this resistive film type touch panel 2, for example, the first electrode (X1) of the first pair, the electrode (X2), corresponding to the fourth electrode of another second pair, the third electrode (X3) of the second pair, the second electrode (X4) of the first pair, the first electrode (X5) of another first pair, and the fourth electrode (X6) of the second pair are arranged in this order in Y direction. As described above, since the electrical combinations of the two detection electrodes adjacent with each other in Y direction are different from one another, the combination is uniquely determined if two electrodes are detected for example.

It should be noticed that "the electrical combinations of the two detection electrodes adjacent with each other in Y direction are different from one another" means that if the detection electrodes electrically connected with each other are assumed as one electrode, the combinations of the two detection electrodes adjacent with each other in Y direction do not include the same combination. In the above-described example, the first electrode (X1) and the second electrode (X4) are electrically connected with each other so that they are assumed as one electrode. Furthermore, the third electrode (X3) and the fourth electrode (X6) are electrically connected with each other so that they are assumed as one electrode.

Referring to FIG. 2, the lower electrodes Y1-Y10 will be explained in detail. The electrode Y1 and the electrode Y4 are electrically connected with each other, and the electrode Y5 and the electrode Y8 are electrically connected with each other. The above-described connection points are at first-side ends (upper ends in FIG. 2) of the electrodes in Y direction. As a connection structure, bus bar electrodes 65, 66 are formed extending in X direction. In addition, the electrode Y3 and the electrode Y6 are electrically connected with each other, and the electrode Y7 and the electrode Y10 are electrically connected with each other. The above-described connection points are at second ends of the electrodes in Y direction (i.e., lower ends in FIG. 2). As a connection structure, bus bar electrodes 67, 68 are formed extending in X direction.

It should be noticed that in this embodiment, although the electrode Y2 and the electrode Y9 are not connected with other electrodes, they are connected with other electrodes in other embodiments in which the number of the electrodes is large.

As described above, in the arrangement where the detection electrodes which are not electrically connected with each other are adjacent with each other, a group of the detection electrodes electrically connected with each other is included. Specifically, a group of the two detection electrodes electrically connected with each other is included.

The above-described structure will be described using other expressions below. The plurality of detection electrodes includes a first pair of electrodes consisting of the first electrode (Y1) and the second electrode (Y4), which are connected with each other, and a second pair of electrodes consisting of the third electrode (Y3) and the fourth electrode (Y6), which are connected with each other. The third electrode (Y3) is arranged between the first electrode (Y1) and the second electrode (Y4) in X direction closer to the second electrode (Y4). Between the first electrode (Y1) and the third electrode (Y3) in X direction, a gap is defined in which the electrode (Y2), which corresponds to the fourth electrode of another second pair, is arranged. The second electrode (Y4) is arranged between the third electrode (Y3) and the fourth electrode (Y6) in X direction closer to the third electrode (Y3). Between the second electrode (Y4) and the fourth electrode (Y6), a gap is defined in which the first electrodes (Y5) of another first pair is arranged.

In this resistive film type touch panel 2, for example, the first electrode (Y1) of the first pair, the electrode (Y2), which corresponds to of the fourth electrode of another second pair, the third electrode (Y3) of the second pair, the second electrode (Y4) of the first pair, the first electrode (Y5) of another first pair, and the fourth electrode (Y6) of the second pair are arranged in this order in X direction. As described above, since the electrical combinations of the two detection electrodes adjacent with each other in X direction are different from one another, the combination is uniquely determined if the two electrodes are detected for example.

It should be noticed that "the electrical combinations of the two detection electrodes adjacent with each other in X direction are different from one another" means that if the detection electrodes electrically connected with each other is assumed as one electrode, the combinations of the two detection electrodes adjacent with each other in X direction do not include the same combinations. In the above-described example, the first electrode (Y1) and the second electrode (Y4) are electrically connected with each other so that they are assumed as one electrode. In addition, the third electrode (Y3) and the fourth electrode (Y6) are electrically connected with each other so that they are assumed as one electrode.

It should be noticed that resistive film type touch panel 2 is typically, as shown in FIG. 1, connected to the touch panel controller 21 via an FPC 29.

Routing wires 30A-30G extend from the upper electrode group 13 and the lower electrode group 17 to input/output terminals of the resistive film type touch panel 2. The routing wires 30 are usually formed using a metal, such as gold, silver, copper, or nickel, or an electrically conductive paste made of carbon or the like, by a printing method such as screen printing, offset printing, gravure printing, and flexography, or by a brush coating method; however, the formation of the routing wires 30 is not limited thereto as long as continuity between the FPC 29 and the upper electrode group 13 and between the FPC 29 and the lower electrode group 17 is achieved.

The routing wires 30A-30G include terminals to be connected to the FPC 29. It should be noticed that connecting means to the touch panel are not limited to those in this embodiment. For example, it is not necessary to employ the FPC.

Furthermore, the touch panel controller may be incorporated in the FPC.

Referring to FIG. 1, the routing wires 30A-30F connected to the upper electrode group 13 will be described. The routing wires 30A-30F are formed in the frame area 24 on the lower surface of the transparent insulating film 11. The routing wires 30A-30C are arranged on left side of FIG. 1, and the routing wires 30D-30F are arranged on right side of FIG. 1. The routing wire 30A is connected to the electrode X1 and the electrode X4, the routing wire 30B is connected to the electrode X5 and the electrode X8, and the routing wire 30C is connected to the electrode X9. The routing wire 30D is connected to the electrode X2, the routing wire 30E is connected to the electrode X3 and the electrode X6, and the routing wire 30F is connected to the electrode X7 and the electrode X10.

As described above, the number of routing wires can be reduced to six, while conventionally ten routing wires would have been required. In addition, if the number of routing wires continues to increase, the number of the wires according to the embodiment would become close to ½ of those required conventionally.

Referring to FIG. 2, the routing wires 31A-31F connected with the lower electrode group 17 will be described. The routing wires 31A-31F are formed in the frame area 24 on an upper surface of the transparent insulating film 15. The wires 31A-31C are arranged on a left side in FIG. 2, and the wires 31D-31F are arranged on a right side in FIG. 2. The wire 31A is connected to the electrode Y1 and the electrode Y4, the wire 31B is connected to the electrode Y2, and the wire 31C is connected to the electrode Y3 and the electrode Y6. The wire 31D is connected to the electrode Y5 and the electrode Y8, the wire 31E is connected to the electrode Y9, and the wire 31F is connected to the electrode Y7 and the electrode Y10.

As described above, although conventionally the number of routing wires would have been ten, it can be reduced to six according to this embodiment. In addition, it is apparent that the number of the routing wires according to the embodiment would become close to ½ of those required conventionally if the number of routing wires continues to increase.

(2) Pressing-Down Detection Control Operation

Figure 4:
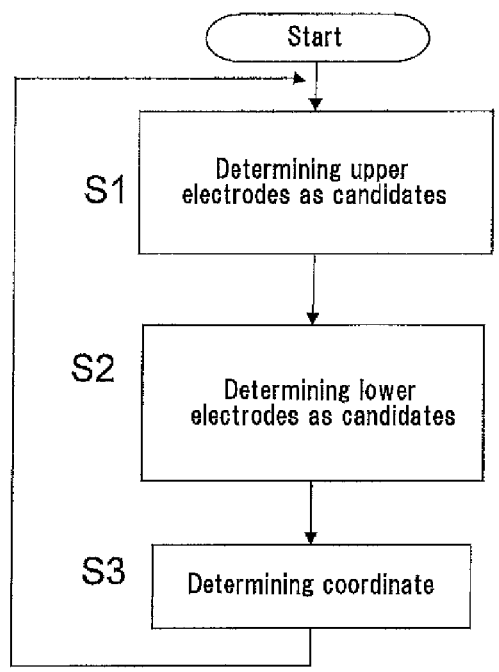
FIG. 4 is a flowchart for the coordinate determination control.
Figure 5:
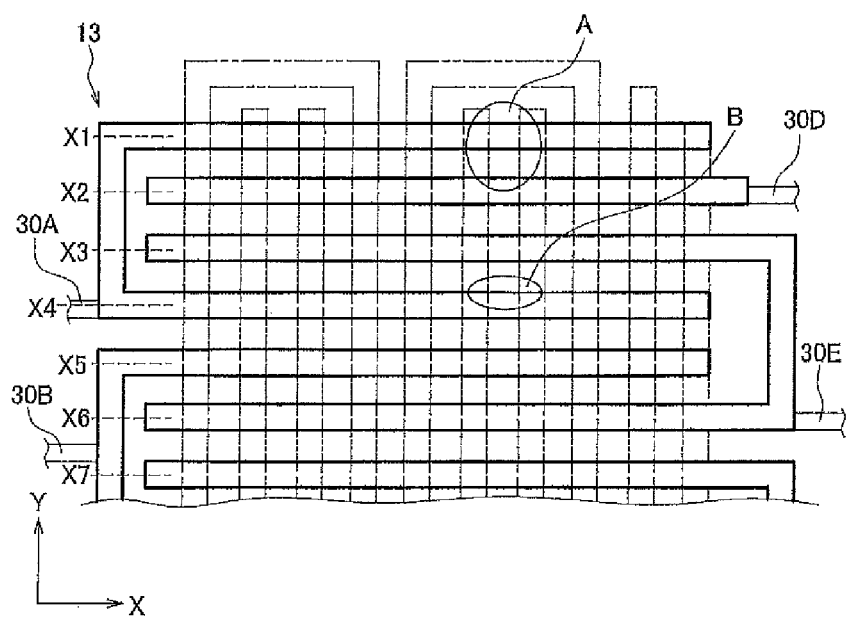
FIG. 5 is a partial plane view of the touch panel.
Figure 6:
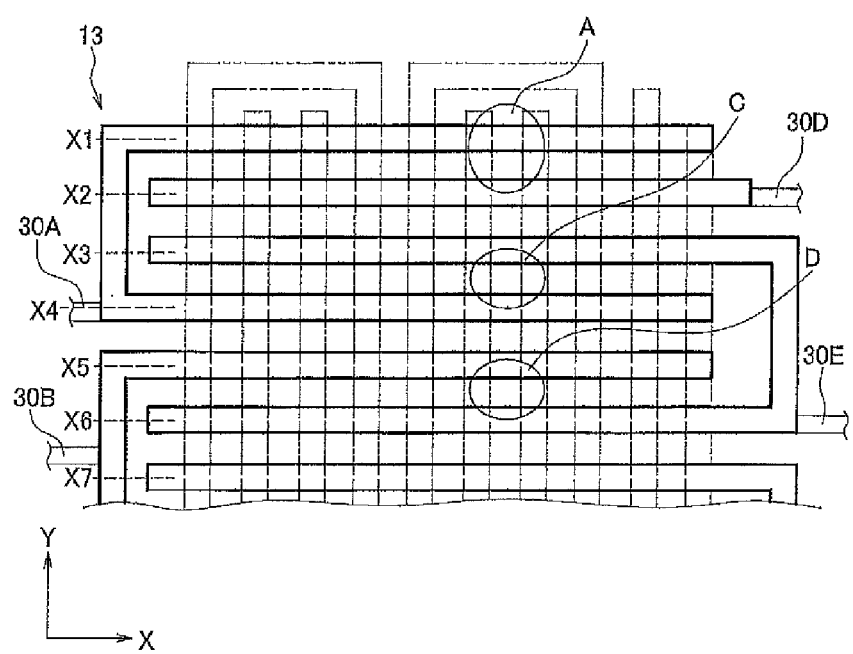
FIG. 6 is a partial plane view of the touch panel.

Referring to FIG. 4, FIG. 5 and FIG. 6, the pressing-down detection control by the touch panel controller 21 will be described. FIG. 4 is a flowchart for the coordinate determination control. FIG. 5 and FIG. 6 are partial plane views of the touch panel.

It should be noticed that if the two electrode adjacent with each other in one direction is in the pressing down condition, it is possible to correctly determine the pressing down position in this embodiment. Accordingly, it is preferable to use an input member having a tip of a shape with a predetermined width such as a stylus pen.

The touch panel controller 21 first determines the upper electrodes as a candidate (step S1).

The touch panel controller 21 determines, next, the lower electrodes as a candidate (step S2). In any of the above-described cases, since the determining method is a conventional matrix resistive film type, the explanation will be omitted.

The touch panel controller 21 finally determines, based on the combination between the lower electrodes as a candidate and the upper electrodes as a candidate, the coordinate of the pressing point (step S3).

It should be noticed that the touch panel controller 21 can detect a plurality of pressing down points in the above-described detection control.

In the above-described detection control, if only one electrode of the upper electrode group 13 or the lower electrode group 17 is in the pressing down condition or three electrodes adjacent with each other in one direction are in the pressing down condition, the touch panel controller 21 can not determine the pressing down position. Accordingly, in this case, the touch panel controller 21 does not determine the position while determining that the pressing down point is a ghost.

For example, since an Area A in FIG. 5 corresponds to the electrode X1 and the electrode X2, the touch panel controller 21 can determine the position in Y direction. However, since a B area in FIG. 5 only corresponds to the electrode X4 in the pressing down condition, when the touch panel controller 21 tries to determine position of the pressing down point in Y direction, it is impossible to determine whether the pressing down portion is the electrode X1 or the electrode X4.

Furthermore, the touch panel controller 21 determines, during the above-described pressing-down detection control, whether or not the detected pressing-down point is effective when the plurality of pressing-down points are detected. Specifically, in FIG. 6, it is assumed that an A area and a C area are detected. The A area corresponds to the electrode X1 and the electrode X2, and the C area corresponds to the electrode X3 and the electrode X4. Accordingly, ones from which the detected signals are output are the first routing wire 30A, the fourth routing wire 30D, and the fifth routing wire 30E. As a result, it becomes impossible to determine the positions of two pressing down points in Y direction. Accordingly, in this case, the touch panel controller 21 ignores any one point as an invalid point.

In contrast, in FIG. 6, if the A area and a D area are pressed down, the A area corresponds to the electrode X1 and the electrode X2, and the D area corresponds to the electrode X5 and the electrode X6. Since the A area and the D area are arranged apart from each other so as to interpose the two electrode X3 and electrode X4 therebetween as described above, both areas are detected as valid areas. Accordingly, ones to which the detected signals are output are the routing wire 30A, the routing wires 30B, the routing wire 30D, and the routing wire 30E. As a result, it is possible to determine the positions of two pressing down points in Y direction.

2. Second Embodiment

Although the plurality of pairs in which the two detection electrodes are electrically connected with each other according to the embodiment, it is possible to decrease the number of routing wires if there is one pair having the detection electrodes electrically connected with each other. In other words, the number is not limited as one in the previous embodiment. Below, an embodiment will be described in which a group is arranged having three detection electrodes electrically connected with each other.

Figure 7:
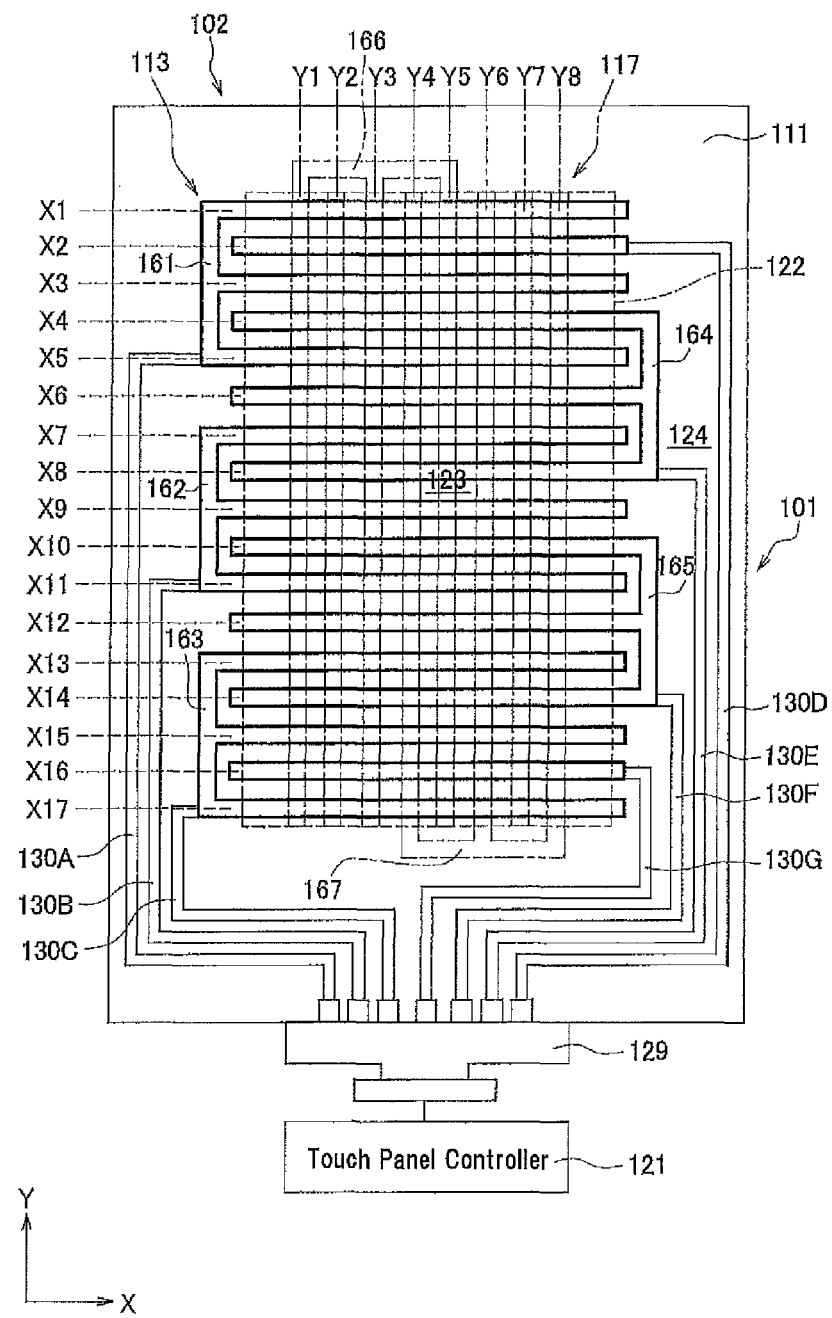
FIG. 7 is a schematic plane view of the touch panel device according to a second embodiment.
Figure 8:
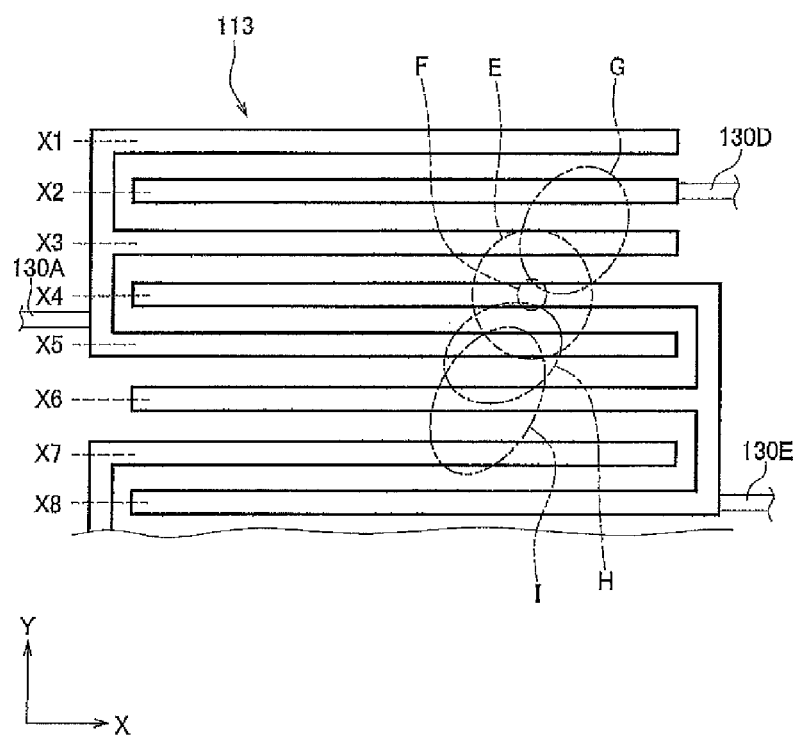
FIG. 8 is a partial plane view of the touch panel.

Referring to FIG. 7 and FIG. 8, a touch panel device 101 will be described according to the second embodiment of the present invention. FIG. 7 is a schematic plane view of the touch panel device according to the second embodiment. FIG. 8 is a partial plane view of the touch panel. It should be noticed that the description about parts common with the first embodiment will be omitted accordingly.

It should be noticed that if three electrodes adjacent with one another in one direction becomes in a pressing down condition, the pressing down position can be correctly determined in this embodiment. Accordingly, it is preferable to employ an input device having a predetermined tip shape such as a stylus pen.

The touch panel device 101 includes a resistive film type touch panel 102 of a matrix type (digital type). The resistive film type touch panel 102 is mainly composed of an upper electrode member and a lower electrode member. The upper electrode member includes a transparent insulating film 111 having a shape of rectangle for example, and an upper electrode group 113 formed on the lower surface of the transparent insulating film 111, for example. The lower electrode member include a transparent insulating film (not shown) having a shape of rectangle for example, and a lower electrode group (not shown) formed on the upper surface of the transparent insulating film. The upper electrode member and the lower electrode member are adhered to each other at peripheral portions thereof via a spacer (not shown).

The touch panel device 101 further includes a touch panel controller 121. The structure and function of the touch panel controller 121 are the same as those in the first embodiment.

The upper electrode group 113 and the lower electrode group 117 are a plurality of strip patterns respectively formed on the transparent insulating film 111 and the transparent insulating film (not shown).

The upper electrode group 113 includes upper electrodes X1-X17 arranged in Y direction, and the upper electrodes extend in X direction, which is a right-left direction in FIG. 7. The lower electrode group 117 includes the lower electrodes Y1-Y8 arranged in X direction, and lower electrodes extend in Y direction, which is an up-down direction in FIG. 7.

Accordingly, the resistive film type touch panel 2 is divided into one hundred thirty six matrix areas as intersection points defined between seventeen upper electrodes X1-X17 and eight lower electrodes Y1-Y8. It should be noticed that it is not necessary to have the upper electrode group and the lower electrode group crossing each other in perpendicular. In other words, they can cross each other at any angles.

It should be noticed that an inside (i.e., the central portion) of the rectangle indicated by dotted lines 122 in FIG. 7 is a sensor area 123 where the above-described matrix is formed, and an outside (i.e., a frame portion surrounding the central portion) of the dotted lines 122 is a frame area 124.

The upper electrodes X1-X10 will be described in detail. The electrode X1 and the electrode X3 and X5 are electrically connected with one another, the electrode X7 and, the electrode X9 and the electrode X11 are electrically connected with one another, the electrode X13, and the electrode X15 and the electrode X17 are electrically connected with one another. The above-described connection points are at first ends of the electrodes in X direction (i.e., left ends in FIG. 7). As a connection structure, bus bar electrodes 161, 162, and 163 are formed extending in Y direction. In addition, the electrode X4, and the electrode X6 and the electrode X8 are electrically connected with one another, and the electrode X10, the electrode X12 and the electrode X14 are electrically connected with one another. The above-described connection points are at second-side ends of the electrodes in X direction (i.e., right ends in FIG. 7). As a connection structure, bus bar electrodes 164, 165 are formed extending in Y direction.

It should be noticed that although the electrode X2 and the electrode X16 are not connected with other electrodes in this embodiment, they are connected with other electrodes in the other embodiment where the number of the electrodes is large.

As described above, in the arrangement where the detection electrodes which are not electrically connected with each other are adjacent with one another, a plurality of groups of the detection electrodes electrically connected with each other are included. Specifically, the group of the three electrode electrically connected with each other is included.

The above-described structure will be described using other expression below. The plurality of detection electrodes includes a first group of electrodes consisting of the first detection electrode (X1), the second detection electrode (X3) and the third detection electrode (X5), which are connected to one another and arranged in this order in the first direction, and a second group including the fourth detection electrode (X4), the fifth detection, the electrode (X6) and the sixth detection electrode (X8), which are connected to one another and arranged in this order in the first direction. Between the second detection electrode (X3), and the third detection electrode (X5) in Y direction, the fourth detection electrode (X4) is arranged. Between the fourth detection electrode (X4) and the fifth detection electrode (X6) in Y direction, the third detection electrode (X5) is arranged. Between the first detection electrode (X1) and the second detection electrode (X3) in Y direction, a gap is defined for arranging the electrode (X2), corresponding to the sixth detection electrode of another second group. Between the fifth detection electrode (X6) and the sixth detection electrode (X8) in Y direction, a gap is defined for arranging the first detection electrode (X7) of another first group.

In this resistive film type touch panel 102, for example, the first detection electrode (X1) of the first group, the electrode (X2) corresponding to the sixth detection electrode of another second group, the second detection electrode (X3) of the first group, the fourth detection electrode (X4) of the second group, the third detection electrode (X5) of the first group, the fifth detection electrode (X6) of the second group, the first detection electrode (X7) of another first group, and the sixth detection electrode (X8) of the second group are arranged in this order in Y direction. As described above, since the electrical combinations of the three detection electrodes adjacent with one another in Y direction are different from one another, it is possible to uniquely determine the combination if the three electrodes are detected for example.

The lower electrodes Y1-Y8 will be described in detail. The electrode Y1, the electrode Y3 and the electrode Y5 are electrically connected with one another. The above-described connection points are at first-side ends (upper ends in FIG. 7) of the electrodes in Y direction. As a connection structure, a bus bar electrode 166 is formed extending in X direction. In addition, the electrode Y4, the electrode Y6 and the electrode Y8 are electrically connected with one another. The above-described connection points are at second-side ends of the electrodes in Y direction (lower ends in FIG. 7). As a connection structure, a bus bar electrode 167 is formed extending in X direction. In this embodiment, although the electrode Y2 and the electrode Y7 are not connected with other electrodes, they are connected with other electrodes in another embodiment in which the number of the electrodes are large.

As described above, in the arrangement where the detection electrodes which are not electrically connected with each other are adjacent with each other, a plurality of groups of the detection electrodes electrically connected with each other is included. Specifically, a group of three electrodes electrically connected with one another are included.

The above-described structure will be described using other expression below. The plurality of detection electrodes includes a first group including the first detection electrode (Y1), the second detection electrode (Y3), and the third detection electrode (Y5), which are connected with one another and are arranged in this order in the first direction, and a second group of electrodes consisting of the fourth detection electrode (Y4), the fifth detection electrode (Y6) and the sixth detection electrode (Y8), which are connected with each other and are arranged in X direction. Between the second detection electrode (Y3) and the third detection electrode (Y5) in X direction, the fourth detection electrode (Y4) is arranged. Between the fourth detection electrode (Y4) and the fifth detection electrode (Y6) in X direction, the third detection electrode (Y5) is arranged. Between the first detection electrode (Y1) and the second detection electrode (Y3) in X direction, a gap is defined for arranging the electrode (Y2) corresponding to the sixth detection electrode of another second group. Between the fifth detection electrode (Y6) and the sixth detection electrode (YX8) in X direction, a gap is defined for arranging an electrode (Y7) corresponding to a first detection electrode of another first group.

In this resistive film type touch panel 102, for example, the first detection electrode (Y1) of the first group, the electrode (Y2) corresponding to the sixth detection electrode of another second group, the second detection electrode (Y3) of the first group, the fourth detection electrode (Y4) of the second group, the third detection electrode (Y5) of the first group, the fifth detection electrode (Y6) of the second group, the first detection electrode (Y7) of another first group, the sixth detection electrode (Y8) of the second group are arranged in this order in X direction. As described above, since the electrical combinations of the three detection electrodes adjacent with one another in X direction are different from one another, it is possible to uniquely determine the combination if the three electrodes are detected for example.

Referring to FIG. 7, the routing wires 130A-130G connected with the upper electrode group 113 will be described. The routing wires 130A-130G are formed in the frame area 124 on the lower surface of the transparent insulating film 111. The wires 130A-130C are arranged on a left side in FIG. 7, and the wires 130D-130G are arranged on a right side in FIG. 7. The wire 130A is connected to the electrode X1, the electrode X3, and the electrode X5. The wire 130B is connected to the electrode X7, the electrode X9, and the electrode X11. The wire 130C is connected to the electrode X13, the electrode X15, and the electrode X17. The wire 130D is connected to the electrode X2. The wire 130E is connected to the electrode X4, the electrode X6, and the electrode X8. The wire 130F is connected to the electrode X10, the electrode X12, and the electrode X14. The wire 130G is connected to the electrode X16.

As described above, the number of routing wires can be decreased reduced to seven, while even though conventionally seventeen routing wires are would have been required. In addition, if the number of routing wires continues to increase, the number of the wires according to the embodiment would become close to ⅓ of those required conventionally.

It should be noticed that the explanation about the routing wires connected to the lower electrode group will be omitted.

In this embodiment, although it is assumed that three electrodes adjacent with one another in one direction are pressed down, it actually happens that two electrodes adjacent with each other in one direction are pressed down. Accordingly, the control for more precisely detecting the position when the three electrodes are pressed down will be described, below.

As shown in FIG. 8, it is assumed that the E area is pressed down. The E area corresponds to the electrode X3, the electrode X4, and the electrode X5. In this case, the routing wires corresponding to the detected electrodes are the routing wires 130A and the routing wires 130E. Accordingly, it is impossible to distinct the above-described case and a case, in which, for example, the electrode X3 and the electrode X4 are pressed down and the electrode X4 and the electrode X5 are pressed down simultaneously as another pressing down point. In this case, the touch panel controller 121 temporarily determines an F area, which is a center of an E area, as a detection position.

Next, if the pressing down position moves to a G area, which is in a right obliquely upward direction in FIG. 8, the corresponding detection electrodes become the electrode X2, the electrode X3, and the electrode X4, so that the touch panel controller 121 can grasp that the pressing down position has moved. If the pressing down position moves to an H area, which is right obliquely downward direction in FIG. 8, the corresponding detection electrodes are the electrode X4, the electrode X5, and the electrode X6 at this point. In this case, since the corresponding routing wires do not change, the touch panel controller 121 does not grasp that the pressing down position has moved. However, if the pressing down position continues to move and arrives at an I area, which is left obliquely downward direction in FIG. 8, the corresponding detection electrodes become the electrode X5, the electrode X6, and the electrode X7. In other words, the corresponding routing wires change, so that the touch panel controller 121 can grasp that pressing down position has moved.

3. Third Embodiment

Although the plural groups of the three detection electrodes electrically connected with each other are arranged while the orientation of them are changed alternately, as long as only one group of the detection electrodes electrically connected with each other exists in the second embodiment, it is possible to decrease the number of routing wires. Accordingly, the invention is not limited to the previous embodiments. Below, an embodiment will be described in which a plurality of groups in which three detection electrodes are electrically connected with one another are provided. In this embodiment, the shape and orientation of the groups are the same.

Figure 9:
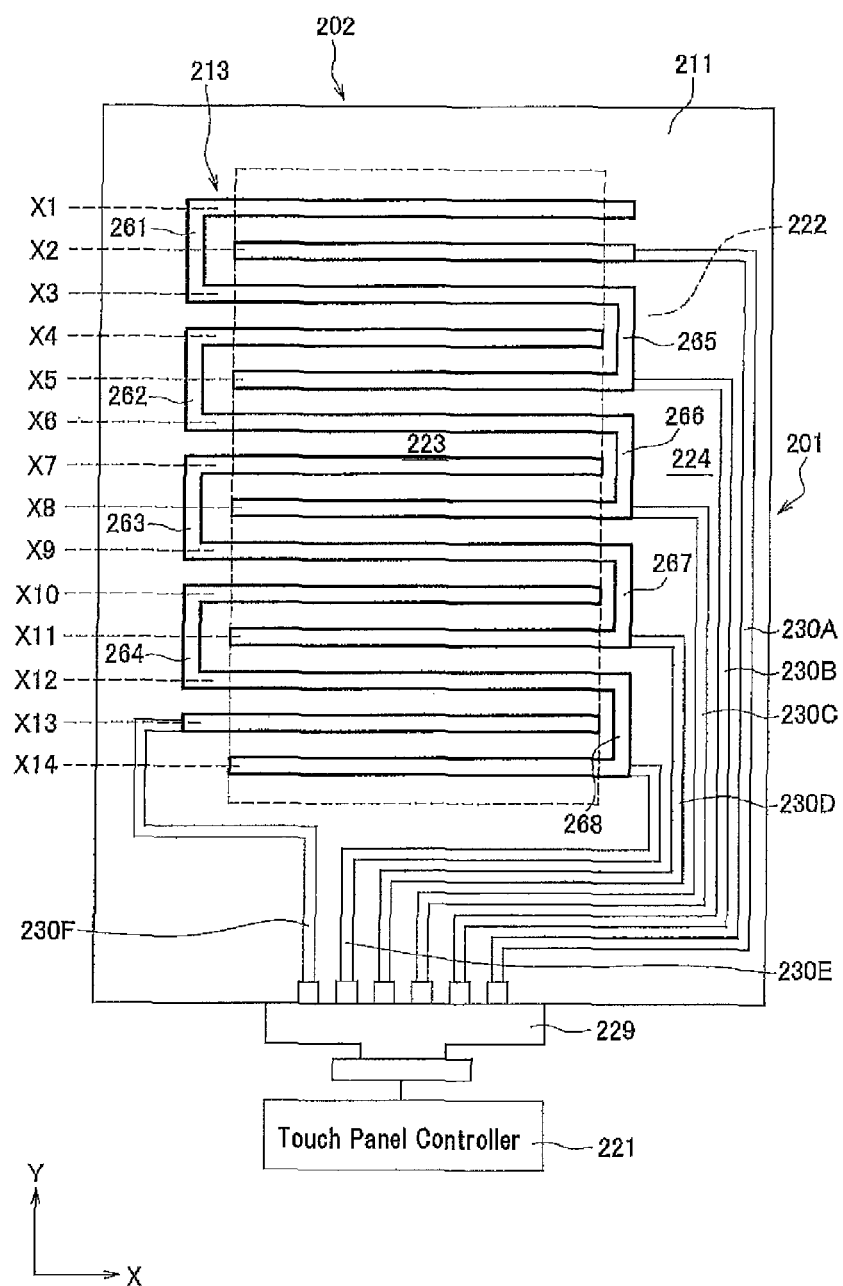
FIG. 9 is a schematic plane view of the touch panel device according to a third embodiment.

Referring to FIG. 9, a touch panel device 201 according to the third embodiment of the present invention will be described. FIG. 9 is a schematic plane view of the touch panel device according to the third embodiment. It should be noticed that parts common with the first embodiment and the second embodiment will be omitted accordingly. Especially, the lower electrode group and the routing wires connected to it will be omitted.

The touch panel device 201 includes a resistive film type touch panel 202 of a matrix type (digital type). The resistive film type touch panel 202 is mainly composed of an upper electrode member and a lower electrode member. The upper electrode members includes a transparent insulating film 211 having a shape of rectangle for example, and an upper electrode group 213 formed on a lower surface of the transparent insulating film 211. The lower electrode member includes a transparent insulating film (not shown) having a shape of rectangle for example, and a lower electrode group (not shown) formed on an upper surface of the transparent insulating film. The upper electrode member and the lower electrode member are adhered to each other at peripheral portions thereof via a spacer (not shown).

The touch panel device 201 further includes a touch panel controller 221. The structure and function of the touch panel controller 221 are the same as those in the previous embodiments.

The upper electrode group 213 consists of a plurality of strip patterns formed on the transparent insulating film 211.

The upper electrode group 213 consists of the upper electrodes X1-X14 arranged in Y direction, and the upper electrodes extend in X direction, which is a right-left direction in FIG. 9.

Accordingly, the resistive film type touch panel 202 is divided into a plurality of matrix areas as intersection points defined between the fourteen upper electrodes X1-X14 and the lower electrodes (not shown).

It should be noticed that an inside of the rectangle indicated by dotted lines 222 in FIG. 9 (i.e., a central portion) is a sensor area 223 where the above-described matrix is formed, and an outside of the dotted lines 222 (i.e., a peripheral portion surrounding the central portion) is a frame area 224.

The upper electrodes X1-X14 will be described in detail. The electrode X1, the electrode X3, and the electrode X5 are electrically connected with one another, the electrode X4, the electrode X6, and the electrode X8 are electrically connected with one another, the electrode X7, the electrode X9 and the electrode X11 are electrically connected with one another, the electrode X10, the electrode X12 and the electrode X14 and are electrically connected with one another. The connection points of the electrode X1 and the electrode X3 are at first-side ends of the electrodes in X direction (left ends in FIG. 9), and as a connection structure bus bar electrodes 261, 262, 263, and 264 are formed extending in Y direction. The connection points of the electrode X3 and X5 are second-side ends of the electrodes X direction (right ends in FIG. 9), and as a connection structure, bus bar electrodes 265, 266, 267, and 268 are formed extending in Y direction.

It should be noticed that although in this embodiment the electrode X2 and the electrode X13 are not connected with other electrodes, they are connected with other electrodes in another embodiment in which the number of the electrodes is large.

As described above, in the arrangement in which the detection electrodes which are not electrically connected with each other are adjacent with each other groups of the detection electrodes electrically connected with each other are included. Specifically, the group of the three electrodes electrically connected with each other is included.

The above-described structure will be described using other expression, below. The plurality of detection electrodes includes plural groups, which includes first-side electrodes (the electrode X1, the electrode X4, the electrode X7, the electrode X10), intermediate electrodes (the electrode X3, the electrode X6, the electrode X9, the electrode X12), and second-side electrodes (the electrode X5, the electrode X8, the electrode X11, the electrode X14), the electrodes of each group being connected with one another and arranged in this order in the first direction.

The first-side electrode (e.g., the electrode X4) and intermediate electrode (e.g., the electrode X6) have first ends (left ends in FIG. 9) connected with each other in X direction. The intermediate electrode (e.g., the electrode X6) and the second-side electrode (e.g., the electrode X8) have the X direction second ends opposed to the first-side ends (right ends in FIG. 9) connected with each other. Between the first-side electrode (e.g., the electrode X4) and the intermediate electrode (e.g., the electrode X6), the second-side electrode of another group (e.g., the electrode X5) is arranged. Between the intermediate electrode (e.g., the electrode X6) and the second-side electrode (e.g., the electrode X8), the first-side electrode in another group (e.g., the electrode X7) is arranged.

In this resistive film type touch panel 202, for example, the first-side electrode of the first group (e.g., the electrode X4), the second-side electrode of another group (e.g., the electrode X5), the intermediate electrode of the first group (e.g., the electrode X6), the first-side electrode of the second group (e.g., the electrode X7), the second-side electrode of the first group (the electrode X8), the intermediate electrode of the second group (e.g., the electrode X9), the first-side electrode of another group (e.g., the electrode X10), the second-side electrode of the second group (e.g., the electrode X11) are arranged in this order in Y direction. Since the electrical combinations of three detection electrodes adjacent with one another in Y direction are different from one another, the combination is uniquely determined if three electrodes are detected for example.

Referring to FIG. 9, the routing wires 230A-230F connected to the upper electrode group 213 will be described. The routing wires 230A-230F are formed in the frame area 224 on the lower surface of the transparent insulating film 211. The wires 230A-230F are arranged on a right side in FIG. 9, and the wire 230F is arranged on a left side in FIG. 9. The wire 230A is connected to the electrode X2, and the wire 230B is connected to the electrode X1, the electrode X3, and the electrode X5. The wire 230C is connected to the electrode X4, the electrode X6, and the electrode X8. The wire 230D is connected to the electrode X7, the electrode X9, and the electrode X11. The wire 230E is connected to the electrode X10, the electrode X12, and the electrode X14. The wire 230F is connected with the electrode X13.

As described above, the number of routing wires can be reduced to six, while conventionally fourteen routing wires would have been required. In addition, if the number of routing wires continues to increase, the number of the wires according to the embodiment would become close to ⅓ of those required conventionally.

In addition, in this embodiment, most of the routing wires can be arranged on one side area in the frame area 224.

4. Fourth Embodiment

Although the groups having a plurality of detection electrodes connected with each other are further combined with each other in the first through third embodiments, if a group of the detection electrodes electrically connected with each other exists, it is possible to decrease the number of routing wires. Accordingly, the present invention is not limited to the previous embodiment. Below, an embodiment will be described in which a group of a plurality of detection electrodes connected with each other and single electrodes are combined for arrangement.

Figure 10:
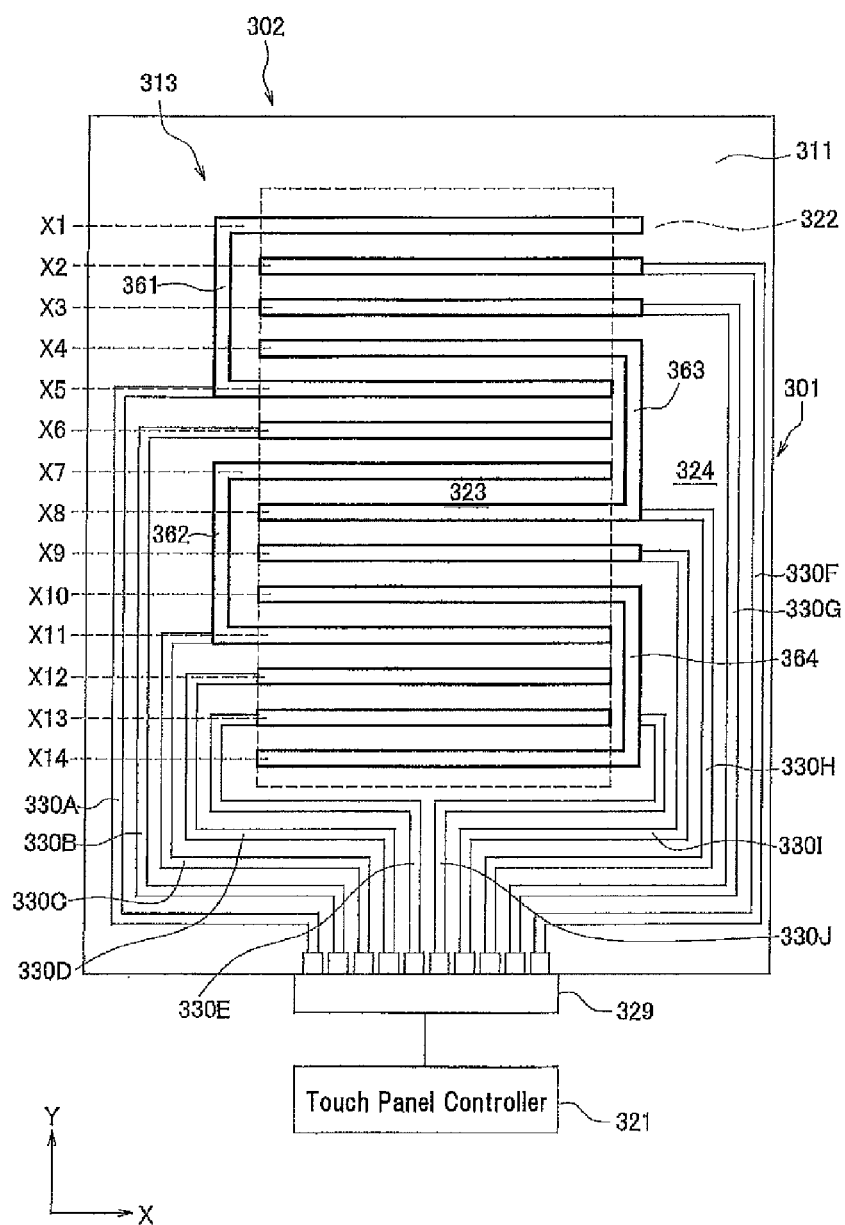
FIG. 10 is a schematic plane view of the touch panel device according to a fourth embodiment.

Referring to FIG. 10, a touch panel device 301 according to the fourth embodiment of the present invention will be described. FIG. 10 is a schematic plane view of the touch panel device according to the fourth embodiment. It should be noticed that parts common with the first embodiment, the second embodiment, and the third embodiment will be omitted accordingly. Especially, the description of the lower electrode group and the routing wires connected to it will be omitted.

The touch panel device 301 includes a resistive film type touch panel 302 of a matrix type (digital type). The resistive film type touch panel 302 is mainly composed of an upper electrode member and a lower electrode member. The upper electrode member includes a transparent insulating film 311 having a shape of rectangle for example, and an upper electrode group 313 formed on a lower surface of the transparent insulating film 311. The lower electrode member includes a transparent insulating film (not shown) having a shape of rectangle for example, and a lower electrode group (not shown) formed on an upper surface of the transparent insulating film. The upper electrode member and the lower electrode member are adhered to each other at peripheral portions thereof with a spacer (not shown).

The touch panel device 301 further includes a touch panel controller 321. The configuration and function of the touch panel controller 321 are the same as those in the previous embodiments.

The upper electrode group 313 consists of a plurality of strip patterns formed on the transparent insulating film 311.

The upper electrode group 313 consists of the upper electrodes X1-X14 arranged in Y direction, and the upper electrode extend in X direction, which is a right-left direction in FIG. 10.

Accordingly, the resistive film type touch panel 302 is divided into a plurality of matrix areas as intersection points by the fourteen upper electrodes X1-X14 and the lower electrodes (not shown).

It should be noticed that an inside of a rectangle indicated by dotted lines 322 in FIG. 10 (i.e., a central portion) is a sensor area where the above-described matrix is formed, and an outside of the dotted lines 322 (i.e., a peripheral portion surrounding the central portion) is a frame area 324.

The upper electrodes X1-X14 will be described in detail. The electrode X1 and the electrode X5 are electrically connected with each other, the electrode X7 and the electrode X11 are electrically connected with each other. The connection points of the above-described electrodes are at first-side ends of the electrodes in X direction (left ends in FIG. 10). As a connection structure, bus bar electrodes 361, 362 are formed extending in Y direction. In addition, the electrode X4 and the electrode X8 are electrically connected with each other, and the electrode X10 and the electrode X14 are electrically connected with each other. The connecting points of the above-described electrodes are at second-side ends of the electrodes in X direction (the right ends in FIG. 10). As a connection structure, bus bar electrodes 363, 364 are formed extending in Y direction.

Between the electrode X1 and the electrode X5, arranged are the electrode X2, the electrode X3, and the electrode X4 in this order in Y direction. The electrode X2 and the electrode X3 are not connected with other electrodes.

Between the electrode X4 and the electrode X8, arranged are the electrode X5, the electrode X6, and the electrode X7 in this order in Y direction. The electrode X6 is not connected with other electrodes.

Between the electrode X7 and the electrode X11, arranged are the electrode X8, the electrode X9, the electrode X10, and the electrode X11 in this order in Y direction. The electrode X9 is not connected with other electrode.

Between the electrode X10 and the electrode X14, arranged are the electrode X11, the electrode X12, and the electrode X13 in this order in Y direction. The electrode X12 and the electrode X13 are not connected with other electrodes.

As described above, a plurality of groups of the detection electrodes electrically connected with each other is included. Specifically, a group of two detection electrodes electrically connected with each other and single electrodes are combined. The groups includes a group of the electrode X1 and the electrode X5, a group of the electrode X4 and the electrode X8, a group of the electrode X7 and the electrode X11, and a group of the electrode X10 and the electrode X14, for example. The single electrodes include the electrode X3, the electrode X6, the electrode X9, and the electrode X12, for example. Since the electrical combinations of the two detection electrodes adjacent with each other are different from each other, the combination is uniquely determined if two electrodes are detected for example.

Referring to FIG. 10, routing wires 330A-330J connected to the upper electrode group 313 will be described. The routing wires 330A-330F are formed in the frame area 324 on the lower surface of the transparent insulating film 311. The wires 330A-330E are arranged on a left side in FIG. 10, and the wires 330E-330J are arranged on a right side in FIG. 10. The wire 330A is connected with the electrode X1 and the electrode X5, and the wire 330B is connected with the electrode X6, and the wire 330C is connected with the electrode X7 and the electrode X11, and the wire 330D is connected with the electrode X12, and the wire 330E is connected with the electrode X13. The wires 330F is connected with the electrode X2, the wire 330G is connected with the electrode X3, the wire 330H is connected to the electrode X4 and the electrode X8, the wire 330I is connected to the electrode X9, and the wire 330J is connected to the electrode X10 and the electrode X14.

As described above, the number of routing wires can be reduced to ten in this example, while conventionally fourteen routing wires would have been required. Furthermore, if the number of routing wires continues to increase, the decreasing rate of the number of the wires increases.

In this embodiment, since the same detection electrode (ones electrically connected with each other are assumed as the same) exist every four electrodes, if the number of the detection electrodes is three or less, it is advantageous that the same combination never happens.

5. Common Matters Among the Embodiments

The first through fourth embodiments include the below-described structure and function in common.

The touch panel (e.g., the resistive film type touch panel 2, 102, 202, 302) includes a base member, a plurality of detection electrodes, and a plurality of routing wires. The plurality of detection electrodes (e.g., the upper electrodes X1-X10 in FIG. 1 of the first embodiment, the upper electrodes X1-X17 in FIG. 7 of the second embodiment, the upper electrodes X1-X14 in FIG. 9 of the third embodiment, the upper electrodes X1-X14 in FIG. 10 of the fourth embodiment) is formed on the first surface (e.g., the lower surface) of the base member (e.g., the transparent insulating films 11, 111, 211, 311) and are arranged in the first direction (e.g., X direction). The plural group of the detection electrodes electrically connected with each other is included. The group includes the electrode X1 and the electrode X4 of the first embodiment, the electrode X1, the electrode X3, and the electrode X5 of the second embodiment, the electrode X1, the electrode X3, and the electrode X5 of the third embodiment, and the electrode X1 and the electrode X5 of the fourth embodiment. The electrical combinations of the detection electrodes adjacent with each other in the first direction of a planned simultaneous detection number (two in the first embodiment and the fourth embodiment, and three in the second embodiment and the third embodiment) are different from one another.

The plurality of routing wires (e.g., the routing wires 30A-30F in the first embodiment, the wires 130A-130G in the second embodiment, the wires 230A-203E in the third embodiment, the wires 330A-330J in the fourth embodiment) extend from the plurality of detection electrodes, and are formed in an area outside of the plurality of detection electrodes (e.g., the frame area 24, 124, 224, and 324) on the first surface.

In this touch panel, since the group of the detection electrodes electrically connected with each other is included, it is possible to decrease the number of routing wires. As a result, it is possible to reduce the area outside of the plurality of detection electrodes, thereby miniaturizing the touch panel.

In addition, since the electrical combinations of the detection electrodes adjacent with each other in the first direction having a planned simultaneous detection number are different from one another, the combination is uniquely determined if the detection electrodes of the planned simultaneous detection number are detected.

Since a plurality of the above-described structures is prepared and they are arranged in a lamination direction such that the electrode extending directions crosses each other, the pressing down position in plane can be detected.

6. Fifth Embodiment

The structure and method of the resistive film matrix (digital) detection system in the touch panel will be described in detail. It should be noticed that this embodiment is a detailed description of the touch panel controller in the first through fourth embodiments.

Figure 11:
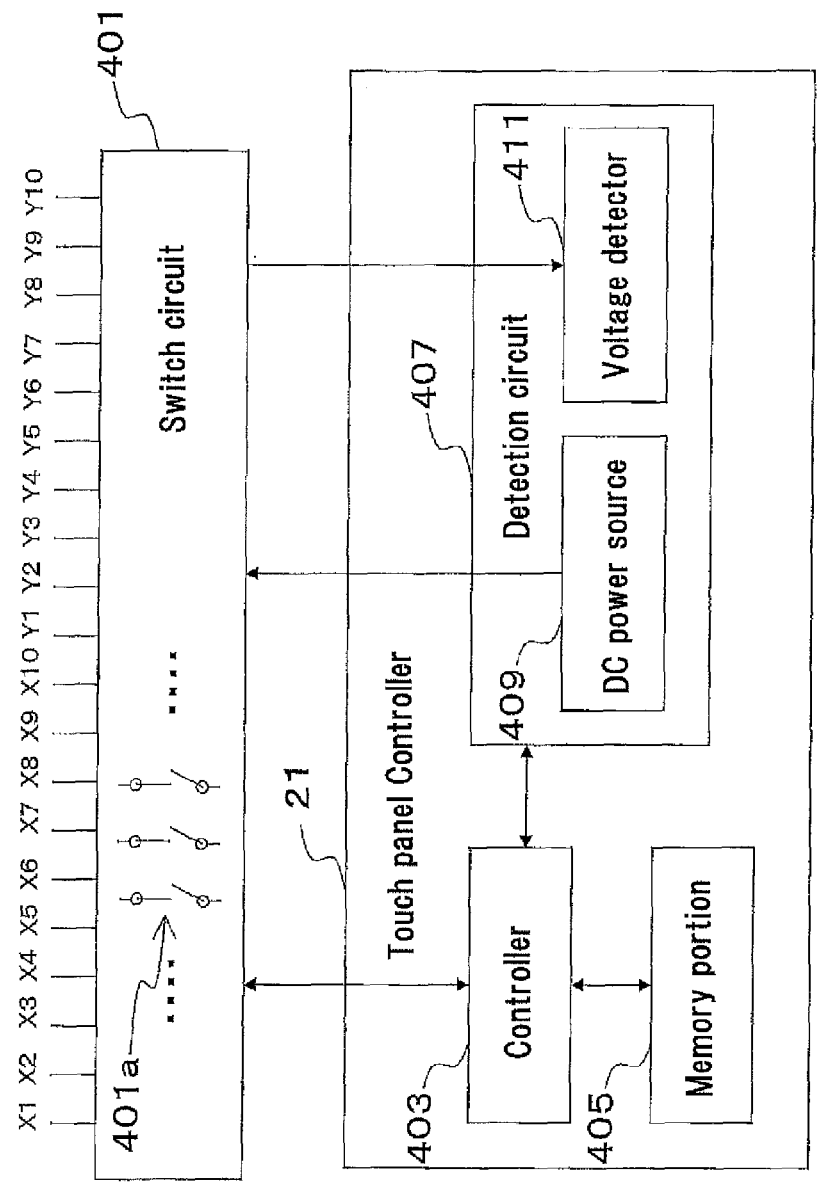
FIG. 11 is a block diagram showing the control configuration of the touch panel controller and the switch circuit according to a fifth embodiment.

Referring to FIG. 11, the structure of the touch panel controller 21 will be described. FIG. 11 is a block diagram showing the control configuration of the touch panel controller and switch circuit.

The touch panel controller 21 includes a controller 403, a memory portion 405, and a detection circuit 407. The controller 403 is composed of a CPU. The memory portion 405 is composed of RAM, ROM and stores the program and data. The detection circuit 407 is a circuit for detecting the pressed position of the decorating film 7, and includes a DC power source 409 and a voltage detector 411. The DC power source 409 provides the electric power to the upper electrodes X1-X10 and the lower electrodes Y1-Y10. The voltage detector 411 is connected with the upper electrodes X1-X10 and the lower electrodes Y1-Y10 (later described).

Between the touch panel controller 21 and touch panel, a switch circuit 401 is arranged. The switch circuit 401 includes a plurality of switches 401a. The plurality of switches 401a can connect and disconnect the DC power source 409 and the upper electrodes X1-X10 as well as the lower electrodes Y1-Y10. The switches 401a of the switch circuit 401 are on/off controlled by the controller 403. It should be noticed that switch circuit 401 may be installed in the touch panel controller 21.

Next, a method by a general resistance film matrix (digital) detection system of the touch panel device 1 will be described.

First, the controller 403 controls the switches 401a of the switch circuit 401 to allow the DC power source 409 to apply DC voltage to the lower electrodes Y1-Y10. Then, the controller 403 controls the switches 401a of the switch circuit 401 to detect, using the voltage detector 411, generation of voltage corresponding to the upper electrodes X1-X10 in order. The generation of the voltage means any of the ten crossing matrix corresponding to the electrode X1 is pressed down and the cross-point matrix is in the electrically conductive state, for example. The controller 403 stores information of the upper electrode from which the voltage is detected as a candidate electrode into the memory portion 405. This step corresponds to step S1 in FIG. 4.

Second, the controller 403 controls the switches 401a of the switch circuit 401 to allow the DC power source 409 to apply the DC voltage to the upper electrodes X1-X10. Then, the controller 403 controls the switches 401a of the switch circuit 401 to detect the generation of the voltage corresponding to the lower electrodes Y1-Y10 in order, using the voltage detector 411. The generation of the voltage means that any of the ten crossing matrix corresponding to the electrode Y1 for example so that the cross-point matrix is in the electrically conductive state. The controller 403 stores information of the lower electrode at which the voltage is detected as a candidate electrode into the memory portion 405. This step corresponds to step S2 in FIG. 4.

Third, the controller 403 reads out information of the candidate electrode stored in the memory portion 405. Then, furthermore, the controller 403 determines whether or not the voltage is detected at the read-out candidate electrodes to determine the combination of the candidate electrodes. The controller 403 stores the combination information about the candidate electrodes into the memory portion 405. This step corresponds to the step S3 in FIG. 4.

7. Sixth Embodiment

As a modification of the combination of the first embodiment and the fifth embodiment, the sixth embodiment will be described below. It should be noticed that since the basic structure and operation are the same as those in the first embodiment and fifth embodiment, only the different points will be mainly described. It should be noticed that in the present embodiment a voltage detection structure is disclosed in which the voltage detector can determine which of the two electrodes connected with each other is pressed.

Figure 12:
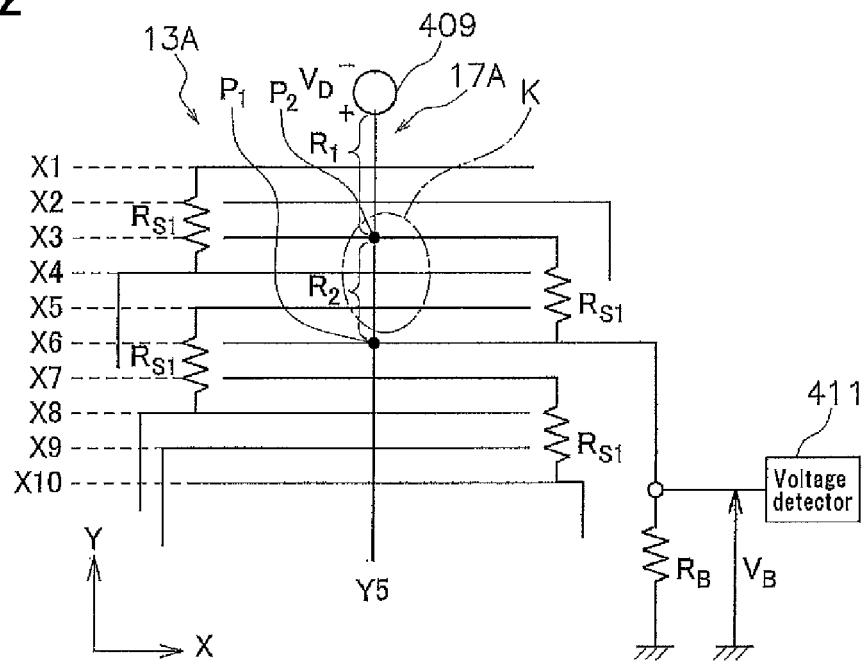
FIG. 12 is a partial plane view of the touch panel according to a sixth embodiment.

Referring to FIG. 12, the upper electrode group and the lower electrode group will be described. FIG. 12 is a partial plane view of the touch panel.

The upper electrode group 13A consists of upper electrodes X1-X10, and the upper electrodes extend in X direction, which is a right-left direction in FIG. 12.

The lower electrode group 17A consists of lower electrodes Y1-Y10 although they are not shown, and the lower electrodes extends in Y direction, which is an up-down direction in FIG. 12. The lower electrodes Y1-10 is opposed to the upper electrodes X1-X10 with a gap therebetween, and can make contact with the upper electrodes X1-X10. It should be noticed that only the electrode Y5 is shown in FIG. 12.

As described above, the resistive film type touch panel 2 is divided into one hundred matrix areas as intersection points defined between the ten upper electrodes X1-X10 and the ten lower electrodes Y1-Y10.

Like the first embodiment, the electrode X1 and the electrode X4 are electrically connected with each other, and the electrode X5 and the electrode X8 are electrically connected with each other. The above-described connection points are at the first-side ends of the electrodes in X direction (i.e., left ends in FIG. 12). As a connection structure, resistance $R_{S1}$ is provided. In addition, the electrode X3 and the electrode X6 are electrically connected with each other, and the electrode X7 and the electrode X10 are electrically connected with each other. The above-described connection points are at second-side ends of the electrodes in X direction (i.e., the right ends in FIG. 12). As a connection structure, resistances $R_{S1}$ are provided respectively.

Materials of the resistance $R_{S1}$ is not limited as long as it realizes the desired resistance value. The resistance $R_{S1}$ may be a pattern made of transparent conductive materials such as ITO, CNT, and PEDOT. The resistance $R_{S1}$ may be a pattern made of conductive pastes such as carbon and silver. If silver is employed, the line width may be made narrower to increase the resistance value. The resistance $R_{S1}$ may be realized by a member such as a chip resistor. The resistance $R_{S1}$ may be realized by combining the above-described structures accordingly.

Accordingly, as one combination of the materials of the members, silver may be used for the electrodes and routing wires, and carbon may be used for portions connecting the plural electrodes.

Here, the voltage detection structure by the voltage detector 411 using the resistance $R_{S1}$ connecting the electrode X3 and the electrode X6 will be described. The resistance $R_{S1}$ is connected with resistance $R_B$ as a reference resistance. An input portion of the voltage detector 411 is connected to between the resistance $R_{S1}$ and the resistance $R_B$.

Below, the operation of selecting a candidate electrode will be described. For a simple description, the control of selecting the electrode X3 or the electrode X6 as a candidate electrode will be described, when the voltage is being applied to the electrode Y5, and either the electrode X3 or the electrode X6 is pressed along the electrode Y5. When the DC power source 409 is applying the voltage $V_D$ to the electrode Y5, if the point $P_2$ as an intersection point by the electrode X3 and electrode Y5 or the point $P_1$ as an intersection point by the electrode X6 and the electrode Y5 is pressed, the voltage detector 411 can measure the voltage drop at the resistance $R_B$. In other words, in the above-described structure, based on the measured value by the voltage detector 411, the controller 403 can determine which is pressed between the electrode X3 and the electrode X6.

It should be noticed that resistance component from the DC power source 409 to the point $P_1$ along the electrode Y5 is resistance $R_1$, and resistance component from the point $P_1$ to the point $P_2$ along the electrode Y5 is resistance $R_2$. In order to obtain a desired resistance component in the electrode Y5, the electrodes Y1-Y10 may be made of carbon or ITO, for example, thereby making the resistance value high. It is preferable that the lower electrodes Y1-Y10 be made of a material which has a sheet resistance having more than 50Ω. In this case, although the resistance values of the lower electrodes Y1-Y10 may be the same degree as those of the upper electrodes X1-X10, it is preferable that the resistance value of the lower electrodes Y1-Y10 be higher than those of the upper electrodes X1-X10. In that case, as one example of the combination of materials of the members, the upper electrodes X1-X10 may be made of silver or silver and carbon, and the lower electrodes Y1-Y10 may be made of ITO or carbon.

Here, as shown in FIG. 12, if the K area (an area extending over the electrode X3, the electrode X4, and the electrode X5) is pressed by the pen, conventionally it was impossible to determine which of the electrode X3 and the electrode X6 is pressed (which of point $P_1$ and point $P_2$ in FIG. 12 is pressed). However, according to the present embodiment, the above-described structure allows the device to determine it as described below.

In this touch panel, if the voltage detector 411 measures the voltage drop of the resistance $R_B$ while the DC power source 409 applying the voltage to the electrode Y5, the controller 403 can determine which position of the electrode X3 and the electrode X6 connected with each other, corresponding to the electrode Y5, is pressed, based on the measured value. The reason is that the voltage drop occurs or does not occur at the resistance $R_{S1}$ and the voltage drop at the electrode Y5 becomes different from each other, depending on which position is pressed between the electrode X3 and the electrode X6.

Figure 13:
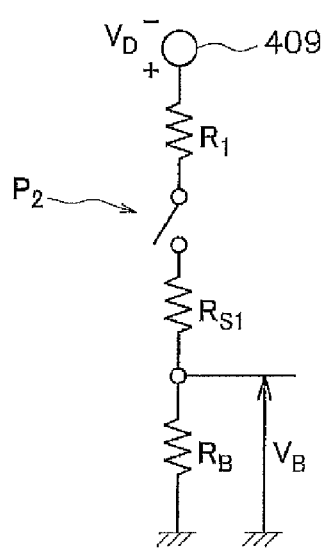
FIG. 13 is an electrical circuit diagram for explaining about the voltage detection by the voltage detector.

First, referring to FIG. 12 and FIG. 13, a case will be described where the electrode X3 is pressed. FIG. 13 is an electrical circuit diagram for explaining about the voltage detection by the voltage detector.

As shown in FIG. 12, if a K area is pressed (the electrode X3 is pressed), as shown in FIG. 13, the resistance $R_1$, the resistance $R_{S1}$, and the resistance $R_B$ becomes connected to one another in series. Accordingly, $V_B$ measured by the voltage detector 411 becomes as follows.

$$V_B = (R_B * V_D)/(R_B + R_{S1} + R_1) \quad \text{Numerical Formula 1}$$

Figure 14:
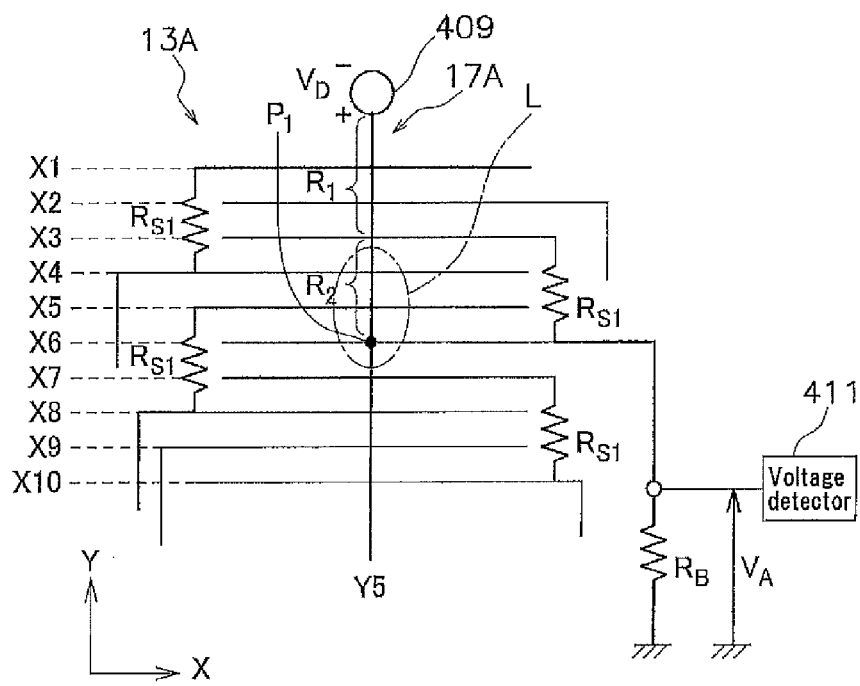
FIG. 14 is a partial plane view of the touch panel.
Figure 15:
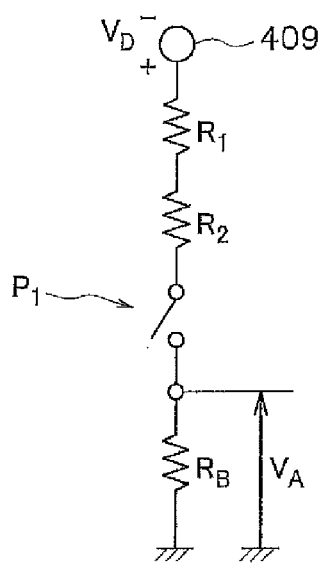
FIG. 15 is an electrical circuit diagram for explaining about the voltage detection by the voltage detector.

Next, referring to FIG. 14 and FIG. 15, a case will be described in which the electrode X6 is pressed. FIG. 14 is a partial plane view of the touch panel. FIG. 15 is an electrical circuit diagram for explaining about the voltage detection by the voltage detector.

As shown in FIG. 14, if an L area is pressed (if the electrode X6 is pressed), as shown in FIG. 15, the resistance $R_1$ and the resistance $R_B$ becomes connected with each other in series. Accordingly, $V_A$ measured by the voltage detector 411 becomes as follows.

$$V_A = (R_B * V_D)/(R_B + R_1 + R_2) \quad \text{Numerical Formula 2}$$

Furthermore, if the electrode X3 and the electrode X6 are pressed (actually, the electrode X3, the electrode X4, the electrode X5, and the electrode X6 are pressed), $V_{AB}$ measured by the voltage detector 411 becomes as follows.

$$V_{AB} = [R_B/(R_B+R_S)] * V_D \text{ (however, } R_S = R_1 + (R_{S1}*R_2)/(R_{S1}+R_2)) \quad \text{Numerical Formula 3}$$

Since $V_A$, $V_B$, $V_{AB}$ are different from one another, it is possible to distinct a case in which the electrode X6 is not pressed and only the electrode X3 is pressed, a case in which the electrode X3 is not pressed and only the electrode X6 is pressed, and a case in which both the electrode X3 and the electrode X6 are pressed.

It should be noticed that according to the above-described description, a case is described in which an area of total three electrodes (e.g., the electrode X3, the electrode X4, the electrode X5) is pressed, but even in a case in which total one electrode is pressed, it is possible to distinct a case in which the electrode X6 is not pressed and only the electrode X3 is pressed (i.e., a case in which the point $P_2$ is pressed), and a case in which the electrode X3 is not pressed and only the electrode X6 is pressed (a case in which the point $P_1$ is pressed).

In this embodiment, since the electrode Y5 has a certain resistance component, even if the position of four electrodes are pressed for example, it is advantageously possible to precisely detect the resistance value. And, regarding this point, it is preferable that the resistance values of the lower electrodes Y1-Y10 be respectively higher than the resistance values of the upper the electrodes X1-X10. However, even if the resistance component of the electrode Y5 hardly exists or is very little, it is possible to distinct which positions is pressed corresponding to the electrode X3 or the electrode X6.

8. Seventh Embodiment

As a modification of the combination of the second embodiment and the fifth embodiment, the seventh embodiment will be described below. It should be noticed that since the basic structure and operation are the same, points different from the second embodiment and the fifth embodiment will be mainly described. It should be noticed that, a voltage detection structure is disclosed in which the voltage detector can distinct which of three electrode connected with one another in the present embodiment.

Figure 16:
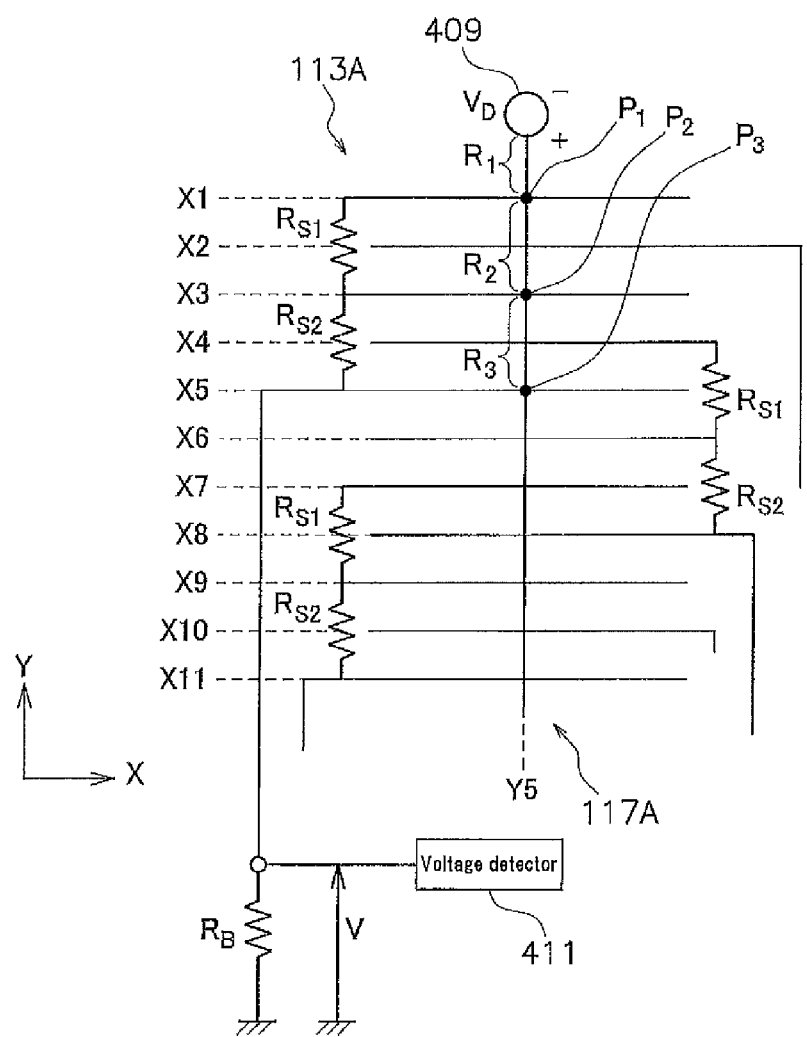
FIG. 16 is a partial plane view of the touch panel according to a seventh embodiment.

Referring to FIG. 16, the upper electrode group and the lower electrode group will be described. FIG. 16 is a partial plane view of the touch panel. In this embodiment, if three electrodes adjacent with each other in one direction becomes in a pressing down condition, it is possible to correctly determine the pressing down position.

The upper electrode group 113A consists of upper electrodes X1-X17 arranged in Y direction, and the upper electrodes extend in X direction, which is a right-left direction in FIG. 16.

The lower electrode group 117B consists of lower electrodes Y1-Y8 arranged in X direction, and the lower electrodes extend in Y direction, which is an up-down direction in FIG. 16. It should be noticed that the electrode Y5 is only shown in FIG. 16.

As described above, the resistive film type touch panel is divided into one hundred thirty six matrix areas as intersection points defined between the seventeen upper electrodes X1-X17 and the eight lower electrodes Y1-Y8.

The upper electrodes X1-X17 will be described in detail. The electrode X1, the electrode X3, and the electrode X5 are electrically connected with one another, the electrode X7, the electrode X9, and the electrode X11 are connected with one another, and the electrode X13, the electrode X15, and the electrode X17 are connected with one another. As described above, in an arrangement in which the detection electrodes which are not electrically connected with each other are arranged adjacent with each other, a plurality of groups of the detection electrodes electrically connected with each other is included. Specifically, a group of three electrodes electrically connected with each other is included. The above-described connection points are at first-side ends of the electrodes in X direction (i.e., left ends in FIG. 16). As a connection structure, resistance $R_{S1}$ and resistance $R_{S2}$ are provided. In addition, the electrode X4, the electrode X6, and the electrode X8 are electrically connected with each other, and the electrode X10, the electrode X12, and the electrode X14 are connected with one another. The above-described connection points are at second-side ends of the electrodes in X direction (i.e., right ends in FIG. 16). As a connection structure, the resistance $R_{S1}$ and resistance $R_{S2}$ are provided.

Here, a voltage detection structure comprised by the voltage detector 411 will be described, using, as an example, the resistance $R_{S1}$, which connects the electrode X1, 0 the electrode X3 and the resistance $R_{S2}$, which connects the electrode X3 and the electrode X5. The resistance $R_{S1}$ and the resistance $R_{S2}$ are connected with the resistance $R_B$. Furthermore, the input portion of the voltage detector 411 is connected to between the resistance $R_{S2}$ and the resistance $R_B$.

Below, the operation of selecting a candidate electrode will be described. Below, for the simple description, the control of selecting the electrode X3 or the electrode X6 as a candidate electrode will be described when the voltage is applied to the electrode Y5 and which of the electrode X3 and the electrode X6 is pressed along the electrode Y5. When the DC power source 409 is applying the voltage $V_D$ to the electrode Y5, if the point $P_1$ which is an intersection point by the electrode X1 and the electrode Y5, the point $P_2$ which is an intersection point by the electrode X3 and the electrode Y5, or the point $P_3$ as an intersection point by the electrode X5 and the electrode Y5, is pressed, the voltage detector 411 can measure the voltage drop V at the resistance $R_B$. In other words, in the above-described structure, when the DC power source 409 is applying the voltage to the electrode Y5, for example, the voltage detector 411 can measure the voltages at the electrode X1, the electrode X3 or the electrode X5.

It should be noticed that resistance component from the DC power source 409 to the point $P_1$ along the electrode Y5 is resistance $R_1$, resistance component from the point $P_1$ to the point $P_2$ along the electrode Y5 is resistance $R_2$, resistance component from the point $P_2$ to the point $P_3$ along the electrode Y5 is resistance $R_3$.

In the prior arts, it was impossible to distinct which of the electrode X1, the electrode X3 and the electrode X5 is pressed by a pen (e.g., which of point $P_1$, point $P_2$, or point $P_3$ is pressed in FIG. 16). However, according to the present embodiment, it is possible to distinct them according to the above-described structure, as below.

In this touch panel, while the DC power source 409 is applying the voltage to the electrode Y5, if the voltage detector 411 measures the voltage drop at the resistance $R_B$, the controller 403 can determine which one is pressed corresponding to the electrode Y5 among the electrode X1, the electrode X3, and the electrode X5, which are connected with each other, based on the value. The reason is that depending on the electrode in a pressed position among the detection electrodes connected to one another, the voltage drop either occurs or does not occur in the resistance $R_{S1}$ and resistance $R_{S2}$, and the voltage drops at the electrode Y5 are different from each other.

Figure 17:
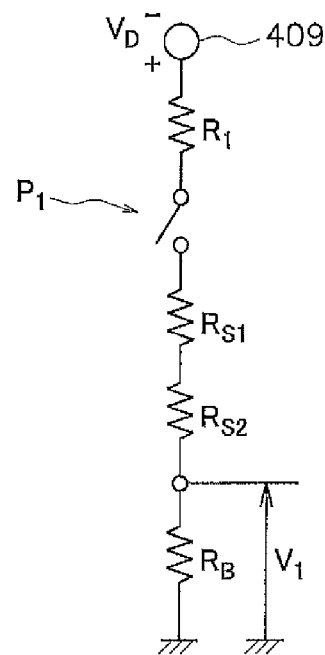
FIG. 17 is an electrical circuit diagram for explaining about the voltage detection by the voltage detector.

First, referring to FIG. 16 and FIG. 17, a case in which the electrode X1 is pressed will be described. FIG. 17 is an electrical circuit diagram for explaining about the voltage detection by the voltage detector.

If the electrode X1 is pressed, as shown in FIG. 17, the resistance $R_1$, which is from the DC power source 409 to the point $P_1$ along the electrode Y5, the resistance $R_{S1}$, the resistance $R_{S2}$, and the resistance $R_B$ become connected with each other in series. Accordingly, $V_1$ measured by the voltage detector 411 becomes as follows.

$$V_1 = (R_B * V_D)/(R_B + R_{S1} + R_{S2} + R_1) \quad \text{Numerical Formula 4}$$

Figure 18:
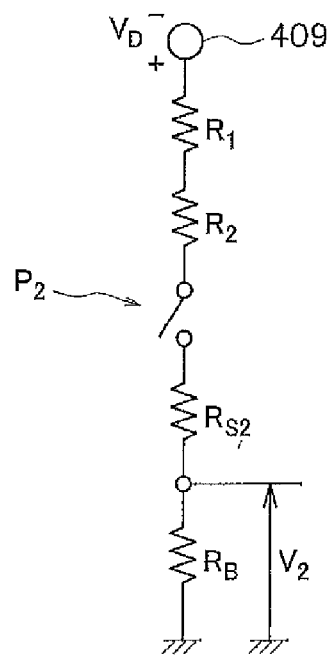
FIG. 18 is an electrical circuit diagram for explaining about the voltage detection by the voltage detector.

Next, referring to FIG. 16 and FIG. 18, a case will be described when the electrode X3 is pressed. FIG. 18 is an electrical circuit diagram for explaining about the voltage detection by the voltage detector.

If the electrode X3 is pressed, as shown in FIG. 18, the resistance $R_1$ from the DC power source 409 to the point $P_1$, the resistance $R_2$ from the point $P_1$ to the point $P_2$, the resistance $R_{S2}$, and the resistance $R_B$ becomes in a state in which they are connected with each other in series, along the electrode Y5. Accordingly, $V_2$ measured by the voltage detector 411 becomes as follows.

$$V_2 = (R_B * V_D)/(R_B + R_{S2} + R_1 + R_2) \quad \text{Numerical Formula 5}$$

Figure 19:
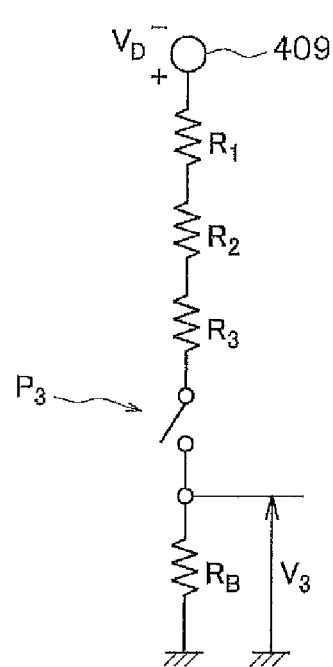
FIG. 19 is an electrical circuit diagram for explaining about the voltage detection by the voltage detector.

Next, referring to FIG. 16 and FIG. 19, a case will be described when the electrode X5 is pressed. FIG. 19 is an electrical circuit diagram for explaining about the voltage detection by the voltage detector.

If the electrode X5 is pressed, as shown in FIG. 19, resistance $R_1$ from the DC power source 409 to the point $P_1$, resistance $R_2$ from the point $P_1$ to the point $P_2$, the resistance $R_3$ from the point $P_2$ to the point $P_3$, and resistance $R_B$ become connected with each in series, along the electrode Y5. Accordingly, $V_3$ measured by the voltage detector 411 becomes as follows.

$$V_3 = (R_B * V_D)/(R_B + R_1 + R_2 + R_3) \quad \text{Numerical Formula 6}$$

Accordingly, since $V_1$, $V_2$, and $V_3$ are different from one another, the controller 403 can distinct a case in which the electrode X3 and X5 are not pressed and only the electrode 1 is pressed, a case in which the electrode X1 and X5 are not pressed and only the electrode X3 is pressed, and a case in which the electrode X1 and the electrode X3 are not pressed and only the electrode X5 is pressed.

It should be noticed that according to the structure, the controller 403 can distinct a case in which the electrode X1 and the electrode X3 are pressed, a case in which the electrode X3 and the electrode X5 are pressed, and a case in which the electrode X1, the electrode X3 and the electrode X5 are pressed.

9. Other Embodiments

Although a plurality of embodiments according to the present invention were described, it will be apparent to those skilled in the art from this disclosure that various changes and modifications can be made herein without departing from the scope of the invention. Especially, the plural embodiments and modifications described in the present specification can be arbitrarily combined as necessary.

Although the touch panel of a resistance film type was described in the first through fourth embodiments, the structure of the first through fourth embodiments can be applied to touch panels of an electrostatic capacity type. In this case, the upper electrode group and the lower electrode group can be formed on different insulating films respectively, or they may be formed each of surfaces of one insulating film.

According to the previous embodiment, although the upper electrode group and the lower electrode group employs the electrode patterns of the same type, the electrode pattern may be different from each other in the up-down direction.

According to the first through fourth embodiments, although the detection electrodes are connected with each other via the bus bar electrodes, the detection electrode connection method is not limited to the previous embodiments. For example, parts of routing wires can be used to connect the detection electrodes.

The present invention is applicable to various kinds of touch panel devices.

The invention claimed is:
1. A touch panel comprising:
    a base member;
    a plurality of detection electrodes, being formed on a first surface of the base member and arranged one by one in a first direction, the detection electrodes including a group of detection electrodes electrically connected with each other, and electrical combinations of detection electrodes adjacent to each other in the first direction of a planned simultaneous detection number are different from one another;
    a plurality of routing wires extending from the plurality of detection electrodes, the routing wires being formed in an area outside of the plurality of detection electrodes on the first surface of the base member,
        the number of the detection electrodes electrically connected with each other is two, and electrical combinations of the two detection electrodes adjacent to each other in the first direction are different from one another,
        the plurality of the detection electrodes includes a first pair of electrodes consisting of a first electrode and a second electrode connected with each other, and a second pair of electrodes consisting of a third electrode and a fourth electrode connected with each other, the first pairs and the second pairs are disposed alternately in the first direction,
the plurality of routing wires includes a first routing wire extending from the first pair and a second routing wire extending from the second pair,
the third electrode is arranged between the first electrode and the second electrode in the first direction closer to the second electrode, and a gap is defined between the first electrode and the third electrode in the first direction for arranging a fourth electrode of another second pair, and
the second electrode is arranged between the third electrode and the fourth electrode in the first direction closer to the third electrode, and a gap is defined between the second electrode and the fourth electrode in the first direction for arranging a first electrode of another first pair; and
a controller configured to determine a pressing down position in the first direction if the pressing down position corresponds to two electrodes adjacent to each other in the first direction, and configured not to determine the pressing down position in the first direction if the pressing down position corresponds to one electrode.

2. The touch panel according to according claim 1, further comprising:
a plurality of second detection electrodes arranged side by side in a second direction crossing the first direction and arranged to overlap the plurality of the detection electrodes, the plurality of the second detection electrodes including a group of the second detection electrodes electrically connected with each other, and electrical combinations of the second detection electrodes adjacent to one another in the second direction of a planned simultaneous detection number are different from one another, and
a plurality of second routing wires extending from the plurality of the second detection electrodes, the second routing wires being formed in an area outside of the second detection electrodes.

3. The touch panel according to claim 1, further comprising:
a first resistance provided between the detection electrodes electrically connected with each other;
a reference resistance connected to the first resistance in series;
a plurality of second detection electrodes opposing to the plurality of detection electrodes with a gap therebetween, and can make contact with the plurality of detection electrodes;
a power source configured to apply voltage to at least one of the second detection electrodes; and
a voltage detector configured to measure voltage drop at the reference resistance.

4. The touch panel according to claim 3, wherein the plurality of the second detection electrodes is composed of a material having a high resistance value compared to the plurality of detection electrodes.

5. A method of detecting a pressing position of the touch panel, for detecting a pressing position of the touch panel according to claim 3, the method comprising:
applying voltage to at least one of the second detection electrodes by the power source;
measuring voltage drop at the reference resistance by the voltage detector; and
determining, based on the measured value of voltage drop, position of the plurality of the detection electrodes connected with each other that is pressed.

6. The touch panel according to claim 1, further comprising:
a fifth electrode disposed between the third electrode and a fourth electrode of another second pair; and
a sixth electrode disposed between the second electrode and a first electrode of another first pair, wherein
the plurality of routing wires includes a third routing wire extending from the fifth electrode and a fourth routing wire extending from the sixth electrode.

7. The touch panel according to according claim 6, further comprising:
a plurality of second detection electrodes arranged side by side in a second direction crossing the first direction and arranged to overlap the plurality of the detection electrodes, the plurality of the second detection electrodes including a group of the second detection electrodes electrically connected with each other, and electrical combinations of the second detection electrodes adjacent to one another in the second direction of a planned simultaneous detection number are different from one another, and
a plurality of seventh routing wires extending from the plurality of the second detection electrodes, the second routing wires being formed in an area outside of the second detection electrodes.

8. The touch panel according to claim 6, further comprising:
a first resistance provided between the detection electrodes electrically connected with each other;
a reference resistance connected to the first resistance in series;
a plurality of second detection electrodes opposing to the plurality of detection electrodes with a gap therebetween, and can make contact with the plurality of detection electrodes;
a power source configured to apply voltage to at least one of the second detection electrodes; and
a voltage detector configured to measure voltage drop at the reference resistance.

9. The touch panel according to claim 8, wherein the plurality of the second detection electrodes is composed of a material having a high resistance value compared to the plurality of detection electrodes.

10. A method of detecting a pressing position of the touch panel, for detecting a pressing position of the touch panel according to claim 8, the method comprising:
applying voltage to at least one of the second detection electrodes by the power source;
measuring voltage drop at the reference resistance by the voltage detector; and
determining, based on the measured value of voltage drop, position of the plurality of the detection electrodes connected with each other that is pressed.

11. A touch panel comprising:
a base member;
a plurality of detection electrodes, being formed on a first surface of the base member and arranged one by one in a first direction, the detection electrodes including a group of detection electrodes electrically connected with each other, and electrical combinations of detection electrodes adjacent to each other in the first direction of a planned simultaneous detection number are different from one another;

a plurality of routing wires extending from the plurality of detection electrodes, the routing wires being formed in an area outside of the plurality of detection electrodes on the first surface of the base member, the number of the detection electrodes electrically connected with one another is three, and electrical combinations of the three detection electrodes adjacent to one another in the first direction are different from one another, the plurality of detection electrodes includes a first group of electrodes consisting of a first detection electrode, a second detection electrode, and a third detection electrode connected with one another and arranged in this order in the first direction, and a second group of electrodes consisting of a fourth detection electrode, a fifth detection electrode, and a sixth detection electrode connected to one another and arranged in this order in the first direction, the first groups and the second groups are disposed alternately in the first direction, the plurality of routing wires includes a fifth routing wire extending from the first group and a sixth routing wire extending from the second group, the fourth detection electrode is arranged between the second detection electrode and the third detection electrode in the first direction, the third detection electrode is arranged between the fourth detection electrode and the fifth detection electrode in the first direction, a gap is defined between the first detection electrode and the second detection electrode in the first direction for arranging a sixth detection electrode of another second group, and a gap is defined between the fifth detection electrode and the sixth detection electrode in the first direction for arranging a first detection electrode of another first group; and a controller configured to determine a pressing down position in the first direction if the pressing down position corresponds to three electrodes adjacent to each other in the first direction, and configured not to determine the pressing down position in the first direction if the pressing down position corresponds to one or two electrodes.

12. The touch panel according to according claim 11, further comprising:

a plurality of second detection electrodes arranged side by side in a second direction crossing the first direction and arranged to overlap the plurality of the detection electrodes, the plurality of the second detection electrodes including a group of the second detection electrodes electrically connected with each other, and electrical combinations of the second detection electrodes adjacent to one another in the second direction of a planned simultaneous detection number are different from one another, and a plurality of seventh routing wires extending from the plurality of the second detection electrodes, the second routing wires being formed in an area outside of the second detection electrodes.

13. The touch panel according to claim 11, further comprising:

a first resistance provided between the detection electrodes electrically connected with each other;

a reference resistance connected to the first resistance in series;

a plurality of second detection electrodes opposing to the plurality of detection electrodes with a gap therebetween, and can make contact with the plurality of detection electrodes;

a power source configured to apply voltage to at least one of the second detection electrodes; and a voltage detector configured to measure voltage drop at the reference resistance.

14. The touch panel according to claim 13, wherein the plurality of the second detection electrodes is composed of a material having a high resistance value compared to the plurality of detection electrodes.

15. A method of detecting a pressing position of the touch panel, for detecting a pressing position of the touch panel according to claim 13, the method comprising:

applying voltage to at least one of the second detection electrodes by the power source;

measuring voltage drop at the reference resistance by the voltage detector; and determining, based on the measured value of voltage drop, position of the plurality of the detection electrodes connected with each other that is pressed.

16. A touch panel comprising:

a base member;

a plurality of detection electrodes, being formed on a first surface of the base member and arranged one by one in a first direction, the detection electrodes including a group of detection electrodes electrically connected with each other, and electrical combinations of detection electrodes adjacent to each other in the first direction of a planned simultaneous detection number are different from one another;

a plurality of routing wires extending from the plurality of detection electrodes, the routing wires being formed in an area outside of the plurality of detection electrodes on the first surface of the base member, the number of the detection electrodes electrically connected with one another is three, and electrical combinations of the three detection electrodes adjacent to one another in the first direction are different from one another, the plurality of detection electrodes includes plural groups each consisting of a first-side electrode, an intermediate electrode, and a second-side electrode connected to one another and arranged in this order in the first direction, the plurality of groups are disposed alternately in the first direction, each of the plurality of routing wires extends from each of the plurality of groups, the first-side electrode and the intermediate electrode include first ends in a second direction crossing the first direction, the first ends are being connected with each other, the intermediate electrode and the second-side electrode include second ends opposite to the first ends in the second direction, the second ends being connected with each other, a gap is defined between the first-side electrode and the intermediate electrode for arranging a second-side electrode of another group, and a gap is defined between the intermediate electrode and the second-side electrode for arranging a first-side electrode of another group; and a controller configured to determine a pressing down position in the first direction if the pressing down position corresponds to three electrodes adjacent to each other in the first direction, and configured not to determine the pressing down position in the first direction if the pressing down position corresponds to one or two electrodes.

17. The touch panel according to claim 16, further comprising:
a plurality of second detection electrodes arranged side by side in a second direction crossing the first direction and arranged to overlap the plurality of the detection electrodes, the plurality of the second detection electrodes including a group of the second detection electrodes electrically connected with each other, and electrical combinations of the second detection electrodes adjacent to one another in the second direction of a planned simultaneous detection number are different from one another; and
a plurality of seventh routing wires extending from the plurality of the second detection electrodes, the second routing wires being formed in an area outside of the second detection electrodes.

18. The touch panel according to claim 16, further comprising:
a first resistance provided between the detection electrodes electrically connected with each other;
a reference resistance connected to the first resistance in series;
a plurality of second detection electrodes opposing to the plurality of detection electrodes with a gap therebetween, and can make contact with the plurality of detection electrodes;
a power source configured to apply voltage to at least one of the second detection electrodes; and
a voltage detector configured to measure voltage drop at the reference resistance.

19. The touch panel according to claim 18, wherein the plurality of the second detection electrodes is composed of a material having a high resistance value compared to the plurality of detection electrodes.

20. A method of detecting a pressing position of the touch panel, for detecting a pressing position of the touch panel according to claim 18, the method comprising:
applying voltage to at least one of the second detection electrodes by the power source;
measuring voltage drop at the reference resistance by the voltage detector; and
determining, based on the measured value of voltage drop, position of the plurality of the detection electrodes connected with each other that is pressed.

* * * * *